US011465572B2

(12) United States Patent
Fuchigami et al.

(10) Patent No.: US 11,465,572 B2
(45) Date of Patent: Oct. 11, 2022

(54) CLAMP AND WIRE HARNESS

(71) Applicants: SUMITOMO WIRING SYSTEMS, LTD., Yokkaichi (JP); TOYOTA JIDOSHA KABUSHIKI KAISHA, Toyota (JP)

(72) Inventors: Masahiro Fuchigami, Yokkaichi (JP); Kazuma Ogino, Yokkaichi (JP); Yusuke Noda, Toyota (JP); Thapakorn Thongchuch, Toyota (JP)

(73) Assignees: SUMITOMO WIRING SYSTEMS, LTD., Mie (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 94 days.

(21) Appl. No.: 17/029,551

(22) Filed: Sep. 23, 2020

(65) Prior Publication Data

US 2021/0094486 A1   Apr. 1, 2021

(30) Foreign Application Priority Data

Sep. 27, 2019   (JP) .............................. JP2019-177568

(51) Int. Cl.
*B60R 16/02*   (2006.01)
*H01B 7/00*   (2006.01)

(52) U.S. Cl.
CPC ....... *B60R 16/0215* (2013.01); *H01B 7/0045* (2013.01)

(58) Field of Classification Search
CPC .......................... B60R 16/0215; H01B 7/0045
USPC ....................................................... 174/72 A
See application file for complete search history.

(56) References Cited

U.S. PATENT DOCUMENTS

| 5,966,781 | A | * | 10/1999 | Geiger | .................... | F16L 3/237 |
| | | | | | | 24/17 AP |
| 6,460,642 | B1 | | 10/2002 | Hirano | | |
| 10,199,813 | B2 | | 2/2019 | Tashiro et al. | | |
| 2003/0222184 | A1 | * | 12/2003 | Geiger | .................... | F16L 3/127 |
| | | | | | | 248/65 |
| 2007/0215757 | A1 | | 9/2007 | Yuta | | |
| 2010/0243824 | A1 | * | 9/2010 | Desai | ...................... | F16L 3/127 |
| | | | | | | 248/65 |

(Continued)

FOREIGN PATENT DOCUMENTS

| CN | 101826709 A | 9/2010 |
| CN | 201708493 U | 1/2011 |

(Continued)

*Primary Examiner* — Timothy J Thompson
*Assistant Examiner* — Michael F McAllister
(74) *Attorney, Agent, or Firm* — Oliff PLC

(57) ABSTRACT

A clamp and a wire harness capable of being easily installed on a fixation portion are provided. The clamp 41 includes the holder 70, which holds the outer sheath 36 accommodating an electric wire, and the fixed portion 50, which is connected to the holder 70 and fixed to the vehicle body panel P1. The fixed portion 50 includes the insertion groove 60, into which the columnar fastener B1 on the vehicle body panel P1 is inserted. The insertion groove 60 extends through the fixed portion 50 in the X-axis direction. The insertion groove 60 is shaped so as to include the mouth 61 in the plan view seen in the X-axis direction. The mouth 61 opens in the Y-axis direction in this embodiment, which is orthogonal to the X-axis direction.

17 Claims, 10 Drawing Sheets

(56) References Cited

U.S. PATENT DOCUMENTS

| | | | | |
|---|---|---|---|---|
| 2010/0294564 | A1* | 11/2010 | Guth | H02G 3/0456 |
| | | | | 174/72 A |
| 2017/0331263 | A1* | 11/2017 | Matsumura | H02G 3/0437 |
| 2019/0123530 | A1* | 4/2019 | Tokuyama | H02G 3/0468 |
| 2019/0293103 | A1* | 9/2019 | Isaji | F16B 5/123 |

FOREIGN PATENT DOCUMENTS

| | | |
|---|---|---|
| CN | 207661222 U | 7/2018 |
| JP | H07-2690 U | 1/1995 |
| JP | H10-231956 A | 9/1998 |
| JP | 2000-152470 A | 5/2000 |
| JP | 2003-229185 A | 8/2003 |
| JP | 2007-232063 A | 9/2007 |
| JP | 2011-091905 A | 5/2011 |
| JP | 2018-059587 A | 4/2018 |

* cited by examiner

CLAMP AND WIRE HARNESS

BACKGROUND

1. Field

The present disclosure relates to a clamp and a wire harness.

2. Description of Related Art

Japanese Laid-Open Patent Publication No. 2018-59587 describes an example of a typical known wire harness including a clamp. The clamp holds an outer sheath that accommodates an electric wire, and the clamp is fixed to a vehicle body. Such a clamp includes a holder that holds the outer sheath and a fixed portion fixed to the vehicle body. The fixed portion includes an insertion hole into which a bolt on the vehicle body is inserted. The insertion hole has the shape of a closed loop.

It is desired that the efficiency of installing the wire harness on a fixation portion such as a vehicle body panel be improved. There is thus still room for improvement for the installation efficiency.

SUMMARY

It is an objective of the present disclosure to provide a clamp and a wire harness capable of being easily installed on a fixation portion.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

The clamp of the present disclosure includes a first holder that holds a first outer sheath that accommodates a first electric wire and a fixed portion configured to be connected to the first holder and fixed to a fixation portion. The fixed portion includes an insertion groove into which a columnar fastener on the fixation portion is configured to be inserted. The insertion groove extends through the fixed portion in a first direction. The insertion groove is shaped so as to include a mouth in a plan view seen in the first direction. The mouth opens in a second direction intersecting the first direction.

The clamp and the wire harness of the present disclosure are capable of being easily installed on a fixation portion.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
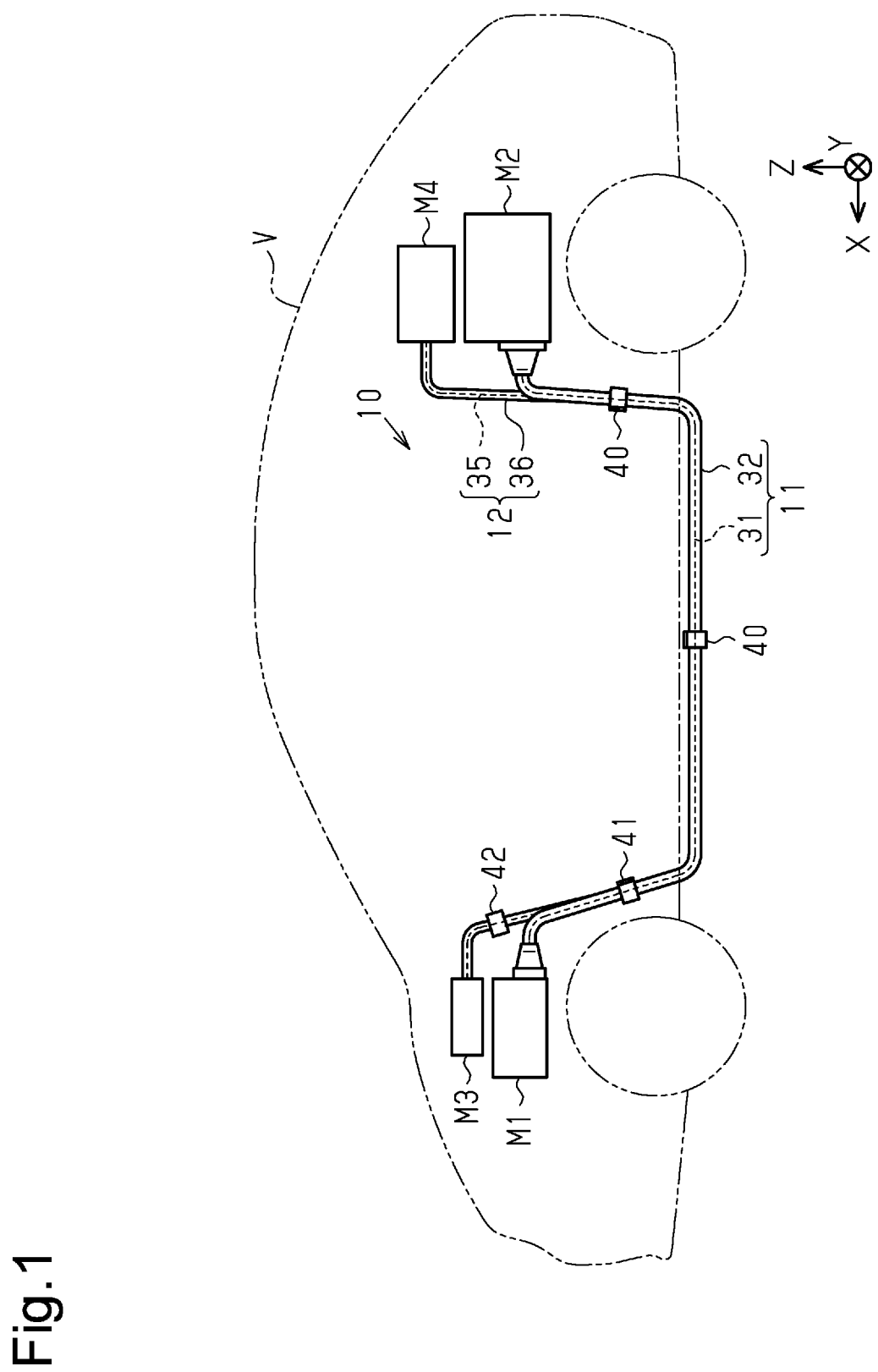
FIG. 1 is a diagram schematically showing the structure of a wire harness according to an embodiment.

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

Description of Embodiments of Present Disclosure

First, the embodiment of the present disclosure will be listed and described.

[1] The clamp of the present disclosure includes a first holder that holds a first outer sheath that accommodates a first electric wire and a fixed portion configured to be connected to the first holder and fixed to a fixation portion. The fixed portion includes an insertion groove into which a columnar fastener on the fixation portion is configured to be inserted. The insertion groove extends through the fixed portion in a first direction. The insertion groove is shaped so as to include a mouth in a plan view seen in the first direction. The mouth opens in a second direction intersecting the first direction.

This structure allows the columnar fastener to be inserted into the insertion groove in the first direction and also allows the columnar fastener to be inserted into the insertion groove in the second direction. That is, the columnar fastener is insertable into the insertion groove in two directions. Thus, as compared with an insertion hole having the shape of a closed loop, the number of directions in which the clamp can be installed on the fixation portion is increased. This improves the degree of freedom in the installation direction and thus improves the efficiency of installing the clamp on the fixation portion.

[2] It is preferred that the mouth include a guide that guides the fastener toward a rear side in an insertion direction parallel to the second direction and the guide be inclined such that an opening width of the insertion groove increases from the rear side in the insertion direction toward a front side in the insertion direction.

In this structure, when the fastener is inserted into the insertion groove in the insertion direction, which is parallel to the second direction, the fastener is guided toward the rear side in the insertion direction along the inclined surface of the guide. This facilitates the inserting of the fastener into the rear end (i.e., bottom) of the insertion groove in the insertion direction. Further, the guide increases the opening width of the insertion groove. Thus, when the fastener is inserted into the insertion groove, the fastener can be inserted into the bottom of the insertion groove by the guide even if the position of the bottom of the insertion groove relative to the fastener is slightly deviated. This improves the efficiency of installing the clamp on the fixation portion.

[3] It is preferred that the clamp is configured to be moved in directions of two steps that include a first installation direction and a second installation direction so that the clamp is installed on the fixation portion, the second installation direction intersecting the first installation direction and being parallel to the insertion direction. It is preferred that the guide include a first guide and a second guide, the first guide being located on a rear side in the first installation direction when the guide is positioned to be installed on the fixation portion, the second guide being located on a front side in the first installation direction when the guide is positioned to be installed on the fixation portion. It is preferred that a dimension of the first guide in the second installation direction be set to be smaller than a dimension of the second guide in the second installation direction.

In this structure, when the clamp is moved in the first installation direction, the dimension of the first guide in the second installation direction, which is likely to contact the fastener at an earlier timing, is set to be smaller than that of the second guide in the second installation direction. Thus, when the clamp is moved in the first installation direction, the first guide is restricted from contacting the fastener. This restricts the clamp from moving in the first installation direction.

[4] It is preferred that the insertion groove be located in a plan view seen in the first direction such that the insertion groove protrudes further than the first holder in the second installation direction.

In this structure, the first holder is located rearward from the insertion groove in the opposite direction of the second installation direction. Thus, when the clamp is moved in the second installation direction, the first holder is restricted from contacting the fastener.

[5] It is preferred that the fixed portion include a plastic base provided integrally with the first holder and a fixed plate held on the base, that the fixed plate be made of a metal material having a higher rigidity than a material of which the base is made, and that the fixed plate include the insertion groove.

In this structure, a high strength is ensured in the fixed plate, where the clamp and the fixation portion are fixed. Thus, the clamp can be securely fixed to the fixation portion using, for example, a bolt as the fastener and a nut that is to be mounted on the bolt. This improves the connection reliability of the clamp to the fixation portion.

[6] It is preferred that the clamp further include a second holder that holds a second outer sheath that accommodates a second electric wire configured to be connected to a device that differs from a device to which the first electric wire is configured to be connected and that the first holder, the second holder, and the fixed portion are laid out in a direction intersecting both the first direction and the second direction.

In this structure, the first and second holders are not arranged on an extension line extending in the first direction from the insertion groove, and the first and second holders are not arranged on an extension line extending in the second direction from the insertion groove. Thus, both when the fastener is inserted into the insertion groove in the first direction and when the fastener is inserted into the insertion groove in the second direction, the fastener is restricted from contacting the first and second holders.

[7] It is preferred that the clamp further include a second holder that holds a second outer sheath that accommodates a second electric wire configured to be connected to a device that differs from a device to which the first electric wire is configured to be connected. It is preferred that the first holder include a first mouth that opens in a third direction orthogonal to a longitudinal direction of the first outer sheath, the first mouth allowing the first outer sheath to be inserted into the first holder. It is preferred that the second holder include a second mouth that opens in a fourth direction orthogonal to a longitudinal direction of the second outer sheath, the second mouth allowing the second outer sheath to be inserted into the second holder. It is preferred that the third direction and the fourth direction be set to intersect each other.

In this structure, the first outer sheath and the second outer sheath are respectively inserted into the first holder and the second holder in insertion directions that differ from each other. This allows the first outer sheath and the second outer sheath to be removed from the first holder and the second holder in the directions that differ from each other. In other words, the first outer sheath and the second outer sheath can be easily removed from the clamp in an individual manner.

For example, during a vehicle collision, when an electric device connected to the second electric wire moves from the original installation position due to the collision, the second electric wire and the second outer sheath may move in an unintended direction (hereinafter referred to as "following direction") as the electric device moves. To solve this problem, for example, the fourth direction, which is the opening direction of the second mouth of the second holder, is set to be oriented toward the following direction of the second electric wire and the second outer sheath. This allows the second outer sheath to easily fall from the clamp separately from the first outer sheath when the second outer sheath moves in the following direction. Thus, even if the second electric wire and the second outer sheath move in the following direction during a vehicle collision, the clamp and the first electric wire are restricted from moving together in the following direction as the second electric wire and the second outer sheath move. This restricts the wire harness from being damaged during a vehicle collision.

[8] It is preferred that the first holder include a first cover that covers the first mouth, that the second holder include a second cover that covers the second mouth, and that the first cover and the second cover are separate components.

In this structure, since the first cover that covers the first mouth and the second cover that covers the second mouth are separate components, the first and second covers can be set to open states (that is, the mouths can be opened).

For example, when the first cover and the second cover are integrally provided, it is difficult to open only one of the first mouth and the second mouth. Further, for example, when a single cover that covers the first and second mouths with different opening directions are coupled, the cover is fixed (for example, engaged) in multiple directions. Thus, when the first and second covers are integrally provided, the first and second covers are not easily removed by an external force acting in a single direction. Thus, when the first and second covers are integrally provided, the first and second covers are not easily removed only by a pressing force acting in the following direction from the second outer sheath. In this case, when the second outer sheath moves in the following direction, the movement is hindered by the first and second covers. This causes the clamp and the first outer sheath including the first and second covers to move together as the second outer sheath moves.

In the above-described structure, the first and second covers are separate components. Thus, the fixing direction (for example, engagement direction) in which the second cover is attached so as to cover the second mouth can be set as a single direction. Accordingly, as compared with the first and second covers that are integrally provided, the second cover is easily removed by a pressing force acting in the following direction from the second outer sheath. This restricts the clamp and the first outer sheath from moving in the following direction as the second outer sheath moves in the following direction.

[9] It is preferred that the second holder includes an accommodation portion and the second cover, the accommodation portion including the second mouth and accommodating the second outer sheath, and that the accommodation portion and the second cover be separate components.

In this structure, since the accommodation portion and the second cover are separate components, the second cover can be removed from the accommodation portion (i.e., the clamp). Thus, when the second outer sheath moves in the following direction, the clamp and the first outer sheath are restricted from moving together with the second cover as the second outer sheath moves.

[10] It is preferred that the first holder includes an end connected to the fixed portion and another end connected to the second holder and that the fourth direction be set so as to be oriented away from the first holder.

In this structure, the first holder and the fixed portion are not provided in the fourth direction, which is the opening direction of the second mouth. Thus, when the second outer sheath moves in the following direction, the second outer sheath is restricted from colliding with the first holder and the fixed portion.

[11] It is preferred that the fourth direction be set so as not to be oriented toward an installation surface of the fixation portion when the fixed portion is fixed to the installation surface.

In this structure, when the second outer sheath moves in the following direction, the second outer sheath is restricted from colliding with the fixation portion.

[12] It is preferred that the fourth direction be set so as to be oriented upward in a vertical direction when the fixed portion is fixed to an installation surface of the fixation portion. In this structure, the weight of the second electric wire and the second outer sheath restrict the second electric wire and the second outer sheath from falling from the clamp.

[13] It is preferred that a wire harness includes the first electric wire, the first outer sheath, the clamp according to any one of the above-described items [1] to [12], the clamp being a first clamp coupled to the first outer sheath, and a second clamp coupled to the first outer sheath at a position away from the first clamp in a longitudinal direction of the first outer sheath. It is preferred that the first clamp be configured to be fixed to a first installation surface of the fixation portion and the second clamp be configured to be fixed to a second installation surface on a plane perpendicular to the first installation surface of the fixation portion.

In this structure, the first clamp and the second clamp are respectively fixed to the first installation surface and the second installation surface on the planes orthogonal to each other. In such an installation, the direction in which the first clamp is installed on the first installation surface and the direction in which the second clamp is installed on the second installation surface are normally orthogonal to each other. Thus, when a typical insertion hole having the shape of a closed loop is used, a fastener is inserted into the insertion hole only in a single direction. This makes it difficult to couple the first and second clamps to the first and second installation surfaces, respectively. The above-described structure allows the fastener to be inserted into the insertion groove of the first clamp in two directions. Thus, for example, inserting the fastener on the first installation surface into the insertion groove in the second direction allows the first clamp and the second clamp to be installed on the first installation surface and the second installation surface on the planes orthogonal to each other.

[14] It is preferred that a wire harness include the first electric wire, the first outer sheath, the second electric wire, the second outer sheath, the clamp according to any one of the above-described items [6] to [12], the clamp being a first clamp configured to be coupled to the first outer sheath and the second outer sheath in a portion where the first outer sheath and the second outer sheath are routed in parallel to each other, and a second clamp configured to be coupled to the second outer sheath. It is preferred that the first clamp be configured to be fixed to a first installation surface of the fixation portion and the second clamp be configured to be fixed to a second installation surface on a plane perpendicular to the first installation surface of the fixation portion.

In this structure, the first clamp and the second clamp are respectively fixed to the first installation surface and the second installation surface on the planes orthogonal to each other. In such an installation, the direction in which the first clamp is installed on the first installation surface and the direction in which the second clamp is installed on the second installation surface are normally orthogonal to each other. Thus, when a typical insertion hole having the shape of a closed loop is used, a fastener is inserted into the insertion hole only in a single direction. This makes it difficult to couple the first and second clamps to the first and second installation surfaces, respectively. The above-described structure allows the fastener to be inserted into the insertion groove of the first clamp in two directions. Thus, for example, inserting the fastener on the first installation surface into the insertion groove in the second direction allows the first clamp and the second clamp to be installed on the first installation surface and the second installation surface on the planes orthogonal to each other.

[15] It is preferred that the second direction be set so as to be parallel to a direction in which the second clamp is configured to be coupled to the second installation surface.

In this structure, moving the second clamp toward the second installation surface in the installation direction allows the fastener to be inserted into the insertion groove in the second direction. This allows the installation of the second clamp to the second installation surface and the installation of the first clamp to the first installation surface to be performed simultaneously.

[16] A wire harness includes the first electric wire, the first outer sheath, the second electric wire, the second outer sheath, and the clamp according to any one of the above-described items [7] to [12]. The first outer sheath and the second outer sheath are twisted and routed such that a direction in which the first outer sheath and the second outer sheath are laid out is changed in a section extending a longitudinal direction. This structure reduces the damage that occurs, for example, during a vehicle collision in the wire harness including routing paths that are twisted.

[17] The first electric wire is a low-voltage electric wire, the second electric wire is a high-voltage electric wire including an end connected to an inverter, and the fourth direction is set to be oriented such that the second electric wire and the second outer sheath are allowed to move as the inverter moves during a vehicle collision.

This structure allows the second outer sheath to easily fall from the clamp separately from the first outer sheath when the second outer sheath moves in the following direction as the inverter moves during a vehicle collision. Thus, even if the second outer sheath moves in the following direction during a vehicle collision, the clamp and the first outer sheath are restricted from moving together in the following direction as the second outer sheath moves. This restricts the wire harness from being damaged during a vehicle collision.

Detail of Embodiments of Present Disclosure

Specific examples of clamps and wire harnesses according to the present disclosure will now be described with reference to the drawings. For the illustrative purposes, some parts of the structures in the drawings may be exaggerated or simplified. Further, the dimensional ratios of portions may be different among the drawings. The terms "parallel," "orthogonal," "horizontal," and "perpendicular" are not necessarily used in a strict sense, but may be used in cases where elements are generally parallel with each other, orthogonal to each other, horizontal, or perpendicular within ranges in which such configuration achieves the operational advantages of the present embodiment.

Entire Structure of Wire Harness 10 with Clamps

As shown in FIG. 1, the wire harness 10 electrically connects two, three, or more electrical devices to one another. The wire harness 10 is installed in, for example, a vehicle V such as a hybrid vehicle or an electric vehicle. The wire harness 10 includes a conductive passage 11, which electrically connects a first device M1 and a second device M2 to each other, and a conductive passage 12, which electrically connects a third device M3 and a fourth device M4 to each other. The wire harness 10 includes a clamp 40, which is used to fix the conductive passages 11 and 12 to the vehicle V. The clamp 40 includes, for example, a clamp 41 and a clamp 42. The clamp 41 is used to fix the conductive passages 11 and 12 to a vehicle body panel P1 (refer to FIG. 3) of the vehicle V. The clamp 42 is used to fix the conductive passage 12 to a vehicle body panel P2 (refer to FIG. 3) of the vehicle V.

The left-right direction in FIG. 1 is a vehicle front-rear direction, the direction orthogonal to the plane in FIG. 1 is a vehicle width direction, and the up-down direction in FIG. 1 is a vehicle up-down direction. In the following description, to facilitate understanding, the direction extending in the vehicle front-rear direction is referred to as a X-axis direction, the direction extending in the vehicle width direction is referred to as a Y-axis direction, and the direction extending in the vehicle up-down direction is referred to as a Z-axis direction.

The conductive passage 11 is routed, for example, from the first device M1 to the second device M2 such that a part of the conductive passage 11 in its longitudinal direction extends underneath the floor panel of the vehicle V. The first device M1 is, for example, an inverter arranged closer to the front part of the vehicle V. The second device M2 is, for example, a high-voltage battery arranged rearward from the first device M1 in the vehicle V. The first device M1, which serves as the inverter, is connected to, for example, a wheel driving motor, which is a power source for driving the vehicle V. The inverter generates alternating-current power from the direct-current power of the high-voltage battery and supplies the alternating-current power to the motor. The second device M2, which serves as the high-voltage battery, is, for example, a battery capable of supplying voltage of a hundred volts or higher. That is, the conductive passage 11 of the present embodiment configures a high-voltage circuit that enables the exchange of high voltage between the high-voltage battery and the inverter.

The conductive passage 12 is, for example, routed from the third device M3 to the fourth device M4 such that a part of the conductive passage 12 in its longitudinal direction extends underneath the floor panel of the vehicle V. The third device M3 is, for example, a relay box arranged closer to the front part of the vehicle V. The fourth device M4 is, for example, a low-voltage battery arranged closer to the rear part of the vehicle V. The third device M3, which serves as the relay box, distributes, to various devices installed in the vehicle V, the voltage that has been supplied from the low-voltage battery. The fourth device M4, which serves as the low-voltage battery, is capable of supplying voltage (for example, 12 volts) that is lower than that of the high-voltage battery. That is, the conductive passage 12 of the present embodiment configures a low-voltage circuit capable of dealing with low voltage supplied from the low-voltage battery.

The wire harness 10 includes, for example, a parallel routed part, where the conductive passage 11 and the conductive passage 12 extend in parallel to each other, and an individual routed part, where the conductive passage 11 and the conductive passage 12 extend in different directions. For example, a part of the parallel routed part in its longitudinal direction is routed underneath the floor panel of the vehicle V. The conductive passages 11 and 12 are provided so as to be bent two-dimensionally or three-dimensionally according to the set routing paths.

Figure 2:
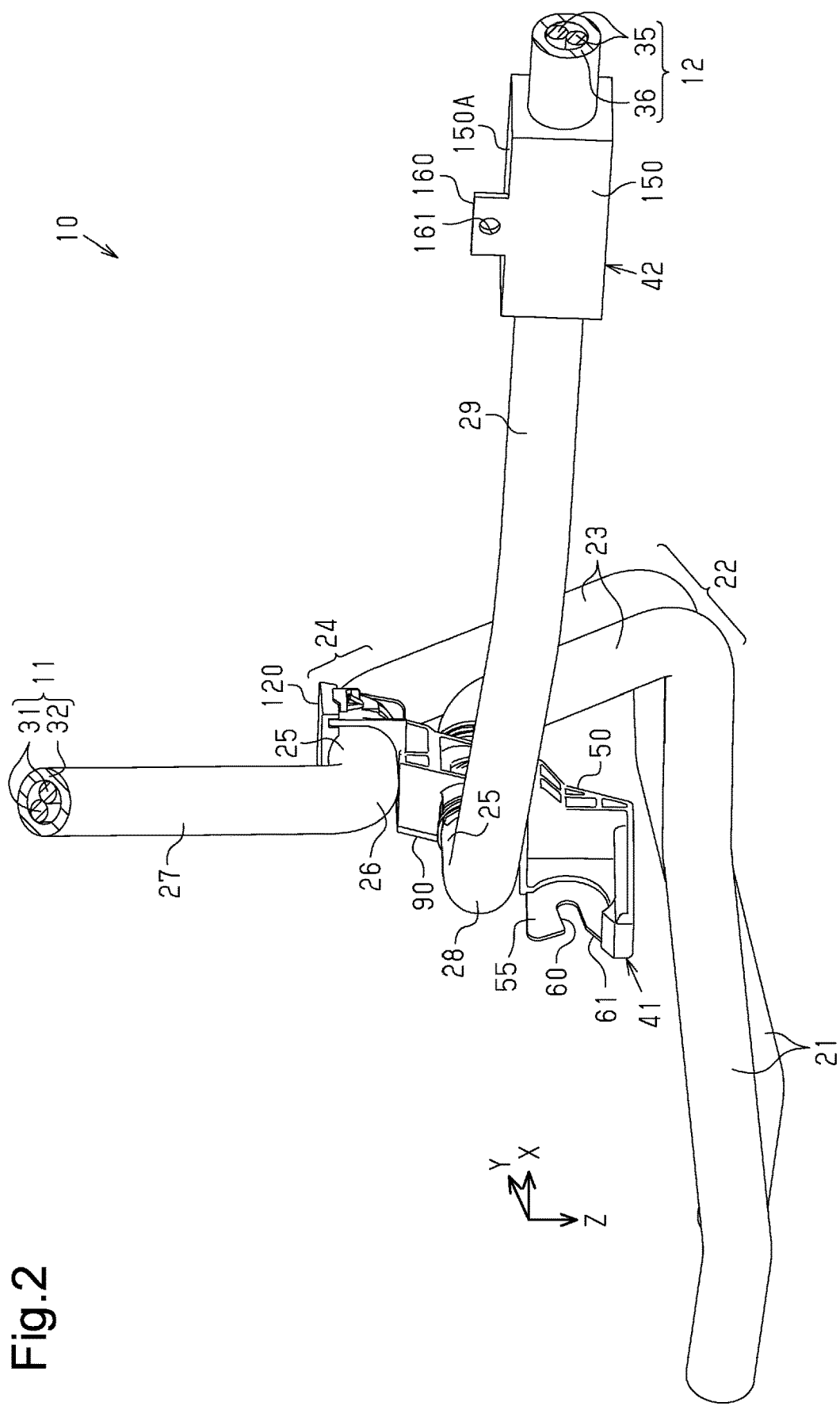
FIG. 2 is a perspective view schematically showing the wire harness according to the embodiment.

As shown in FIG. 2, the conductive passages 11 and 12 of the present embodiment each include an extension 21, which extends in the X-axis direction, a bent portion 22, which is arranged at one end of the extension 21, and an extension 23, which extends upward in the Z-axis direction from the bent portion 22, at the parallel routed part. The conductive passages 11 and 12 of the present embodiment each include a bent portion 24, which is arranged at one end of the extension 23, and an extension 25, which extends from the bent portion 24 toward the plane of the drawings in the Y-axis direction, at the parallel routed part. The conductive passage 11 of present embodiment includes a bent portion 26, which is arranged at one end of the extension 25, and an extension 27, which extends upward in the Z-axis direction from the bent portion 26, at the individual routed part. The conductive passage 12 of present embodiment includes a bent portion 28, which is arranged at one end of the extension 25, and an extension 29, which extends upward in the X-axis direction from the bent portion 28, at the individual routed part. At the extension 21, the bent portion 22, the extension 23 of the parallel routed part, the conductive passage 11 and the conductive passage 12 are routed in parallel in the Y-axis direction. At the bent portion 24 and the extension 25 of the parallel routed part, the conductive passage 11 and the conductive passage 12 are routed in parallel in the Z-axis direction. That is, in the wire harness 10 of the present embodiment, the direction in which the conductive passages 11 and 12 are laid out is changed in a section of the parallel routed part in the longitudinal direction from the direction corresponding to the Y-axis direction to the direction corresponding to the Z-axis direction. In other words, in the wire harness 10 of the present embodiment, the conductive passages 11 and 12 are twisted and routed such that the direction in which the conductive passages 11 and 12 are laid out is changed in a section of the parallel routed part in the longitudinal direction. The bent portion 24 and the extension 25 of the present embodiment in the conductive passage 11 are located above those in the conductive passage 12 in the Z-axis direction.

Structure of Conductive Passage 11

The conductive passage 11 includes one or more (two in this embodiment) electric wires 31 and an outer sheath 32, which surrounds the outer circumference of the electric wire 31. One end of the electric wire 31 is connected to the first device M1 (refer to FIG. 1), and the other end of the electric wire 31 is connected to the second device M2 (refer to FIG. 1).

The electric wire 31 of the present embodiment is a high-voltage electric wire capable of dealing with high voltage and large current. The electric wire 31 may be a shielding electric wire having an electromagnetic shield structure or may be a non-shielding electric wire that does not have an electromagnetic shield structure. Examples of the electric wire 31 include a conductive core and an insulated coating that covers the core. The core may be, for example, a stranded wire composed of stranded metal wires, a cylindrical conductor including one cylindrical metal bar having a solid structure, and a tubular conductor having a hollow structure. The core may be, for example, a combination of a stranded wire, a cylindrical conductor, and a tubular conductor. Examples of the cylindrical conductor include a single core and a bus bar. Examples of the material of the core include a metal material such as copper-based material and aluminum-based material. The insulated coating, for example, covers the entire outer circumferential surface of the core in a close contact state. The insulated coating is made of, for example, insulating material such as synthetic plastic.

The cross-sectional shape obtained by cutting the electric wire 31 on a plane orthogonal to the longitudinal direction of the electric wire 31 may be any shape. That is, the horizontal cross-sectional shape of the electric wire 31 may be any shape. The horizontal cross-sectional shape of the electric wire 31 may be, for example, circular, semi-circular, polygonal, square, or flat.

The entire outer sheath 32 has the shape of an elongated tube. The outer sheath 32 accommodates the electric wire 31. The outer sheath 32 may be, for example, a metal or plastic pipe, a plastic protector, a flexible corrugated tube made of plastic or the like, a rubber waterproof cover, or a combination thereof. Examples of the material of the metal pipe include a metal material such as copper-based material, iron-based metal material, and aluminum-based material. The material of the plastic protector and the corrugated tube may be, for example, conductive plastic material or non-conductive plastic material. The plastic material may be, for example, synthetic plastic such as polyolefin, polyamide, polyester, and ABS plastic. The outer sheath 32 of the present embodiment is a metal pipe that is more rigid than the electric wire 31. The outer sheath 32 of the present embodiment is tubular. The outer sheath 32 of the present embodiment has a protection function to protect the electric wire 31 from a flying object or water droplet and has an electromagnetic shielding function to protect the electric wire 31 from electromagnetic waves.

Structure of Conductive Passage 12

The conductive passage 12 includes one or more (two in this embodiment) electric wires 35 and an outer sheath 36, which surrounds the outer circumference of the electric wire 35. One end of the electric wire 35 is connected to the third device M3 (refer to FIG. 3), and the other end of the electric wire 35 is connected to the fourth device M4 (refer to FIG. 1).

The electric wire 35 of the present embodiment is a low-voltage electric wire capable of dealing with low voltage. The electric wire 35 may be a shielding electric wire having an electromagnetic shield structure or may be a non-shielding electric wire that does not have an electromagnetic shield structure. Examples of the electric wire 35 include a conductive core and an insulated coating that covers the core. The core may be, for example, a stranded wire, a cylindrical conductor, a tubular conductor, or a combination thereof. Examples of the material of the core include a metal material such as copper-based material and aluminum-based material. The insulated coating, for example, covers the entire outer circumferential surface of the core in a close contact state. The insulated coating is made of, for example, insulating material such as synthetic plastic.

The cross-sectional shape obtained by cutting the electric wire 35 on a plane orthogonal to the longitudinal direction of the electric wire 35 may be any shape. That is, the horizontal cross-sectional shape of the electric wire 35 may be any shape. The horizontal cross-sectional shape of the electric wire 35 may be, for example, circular, semi-circular, polygonal, square, or flat.

The entire outer sheath 36 has the shape of an elongated tube. The outer sheath 36 accommodates the electric wire 35. In the same manner as the outer sheath 32, the outer sheath 36 may be a metal or plastic pipe, a plastic protector, a corrugated tube, a rubber waterproof cover, or a combination thereof. The outer sheath 36 of the present embodiment is a metal pipe that is more rigid than the electric wire 35. The outer sheath 36 of the present embodiment is tubular. The outer sheath 36 of the present embodiment has a protection function to protect the electric wire 35 from a flying object or water droplet and has an electromagnetic shielding function to protect the electric wire 35 from electromagnetic waves. For example, the outer diameter of the outer sheath 36 is set to be smaller than that of the outer sheath 32. This is because the electric wire 35 accommodated in the outer sheath 36 has a smaller outer diameter than the electric wire 31 accommodated in the outer sheath 32.

Installation of Clamp 41

As shown in FIG. 2, the clamp 41 is coupled to the conductive passages 11 and 12 at the extension 25 of the parallel routed part. The clamp 41 is coupled to, for example, the outer circumferential surface of the outer sheath 32 in the conductive passage 11 and the outer circumferential surface of the outer sheath 36 in the conductive passage 12.

Figure 3:
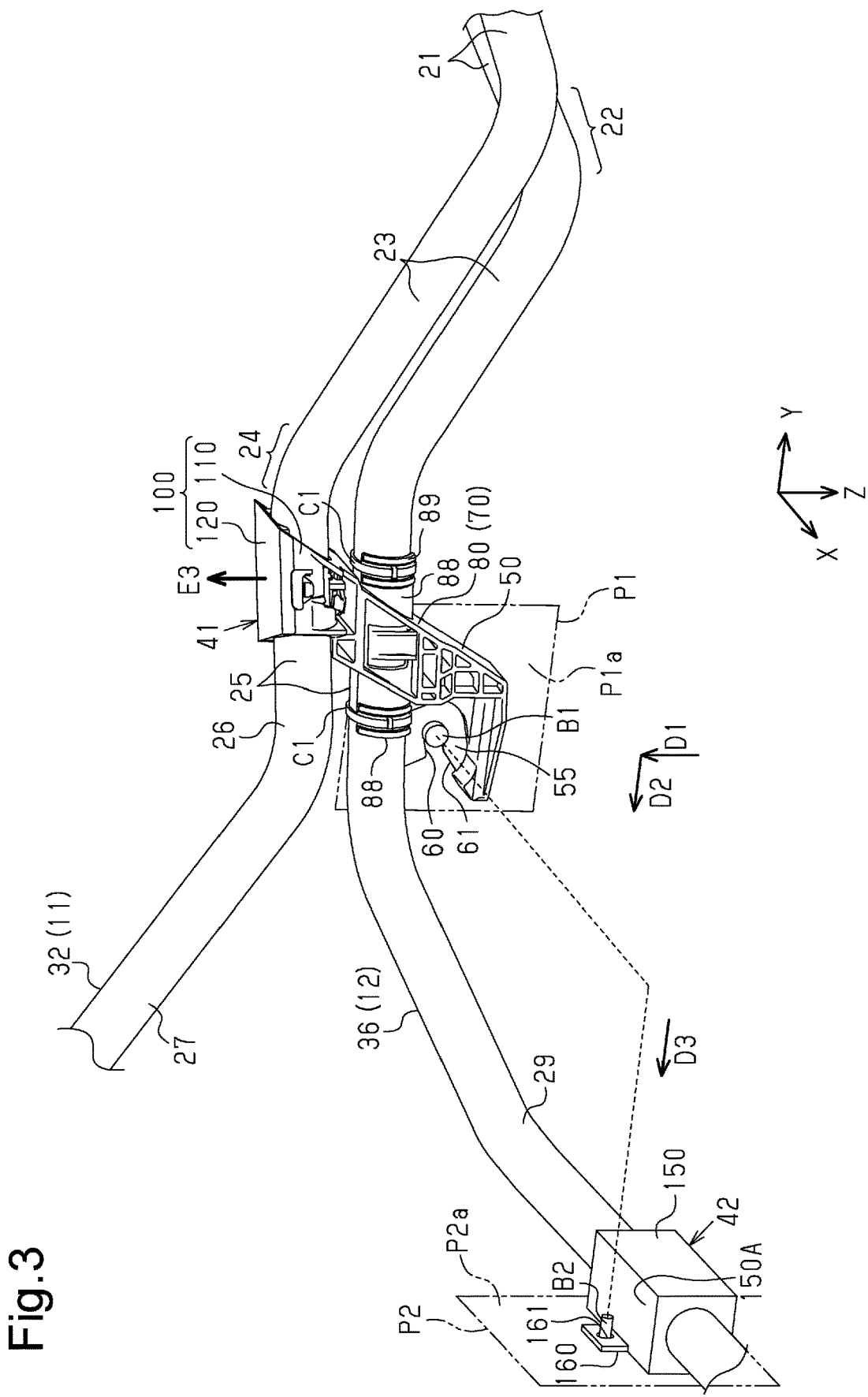
FIG. 3 is a perspective view schematically showing the wire harness according to the embodiment.

As shown in FIG. 3, the clamp 41 fixes the conductive passage 11 and the conductive passage 12 to, for example, an installation surface P1a of the vehicle body panel P1 at the extension 25. For example, a fastener B1 extends from the installation surface P1a perpendicularly to the installation surface P1a. The fastener B1 of the present embodiment extends in the X-axis direction. The fastener B1 is, for example, cylindrical. The fastener B1 may be, for example, a bolt such as a stud bolt. The clamp 41 includes an insertion groove 60, into which the fastener B1 is inserted. The insertion groove 60 extends through the fixed portion 50 in, for example, the direction in which the fastener B1 extends, that is, the X-axis direction (first direction). The insertion groove 60 includes a mouth 61, which opens in the direction (second direction) intersecting the X-axis direction in a plan view seen in the X-axis direction. To insert the fastener B1 into the insertion groove 60, the clamp 41 is first moved upward in the figure in the Z-axis direction and then moved leftward in the Y-axis direction so that the fastener B1 is inserted from the mouth 61 into the insertion groove 60. That is, the direction in which the clamp 41 is installed on the installation surface P1a includes two installation directions including a first installation direction D1 and a second installation direction D2. The clamp 41 is coupled to the installation surface P1a in the first installation direction D1, which is oriented upward in the figure in the Z-axis direction, and then coupled to the installation surface P1a in the second installation direction D2, which is oriented leftward in the figure in the Y-axis direction. The clamp 41 is fixed to the installation surface P1a by mounting a nut (not shown) on the fastener B1 (bolt), which is columnar, with the fastener B1 inserted into the insertion groove 60.

The fastener B1 may be, for example, screwed and coupled to a hole in the vehicle body panel P1, welded to the vehicle body panel P1, or press-fitted to the vehicle body panel P1.

Specific Structure of Clamp 41

Figure 4:
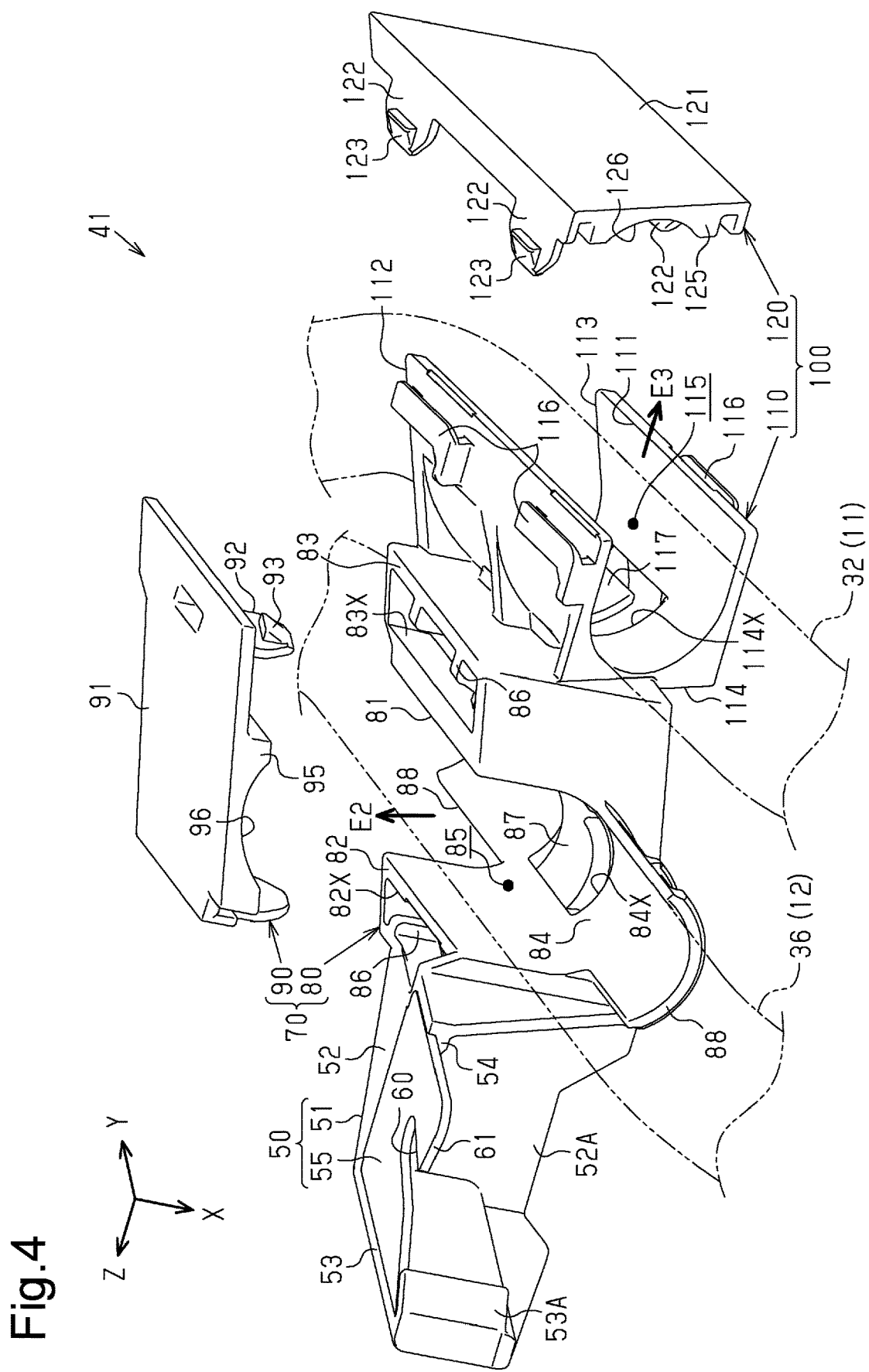
FIG. 4 is an exploded perspective view showing the clamp according to the embodiment.

As shown in FIG. 4, the clamp 41 includes a fixed portion 50, which is fixed to the installation surface P1a (FIG. 3) of the vehicle body panel P1, a holder 70, which holds the conductive passage 12, and a holder 100, which holds the conductive passage 11. In the clamp 41 of the present embodiment, the holder 70 is located adjacent to the fixed portion 50, and the holder 100 is located adjacent to the holder 70. That is, in the clamp 41 of the present embodiment, the fixed portion 50, the holder 70, and the holder 100 are laid out in this order.

Structure of Fixed Portion 50

The fixed portion 50 includes a synthetic plastic base 51 and a fastening hardware 55, which is integrated with the base 51. The fastening hardware 55 is provided integrally with the base 51 through, for example, insert-molding. The base 51 functions as, for example, a holder that holds the fastening hardware 55. Examples of the material of the base 51 include synthetic plastic such as polyolefin, polyamide, polyester, and ABS plastic. Examples of the material of the fastening hardware 55 include a material having a higher mechanical strength (such as rigidity or hardness) than the material of the base 51. Examples of the material of the fastening hardware 55 include a metal material such as iron-based material or copper-based material.

The base 51 includes a holding wall 52, which extends in the Z-axis direction from the holder 70, and a holding wall 53, which extends in the Y-axis direction from the end of an inner surface 52A of the holding wall 52 in the Z-axis direction. The holding wall 52, for example, has a predetermined thickness in the Y-axis direction and spreads in the X-axis direction and the Z-axis direction. The holding wall 53, for example, has a predetermined thickness in the Z-axis direction and spreads in the X-axis direction and the Y-axis direction. The base 51 is, for example, L-shaped in the plan view seen in the X-axis direction.

Figure 5:
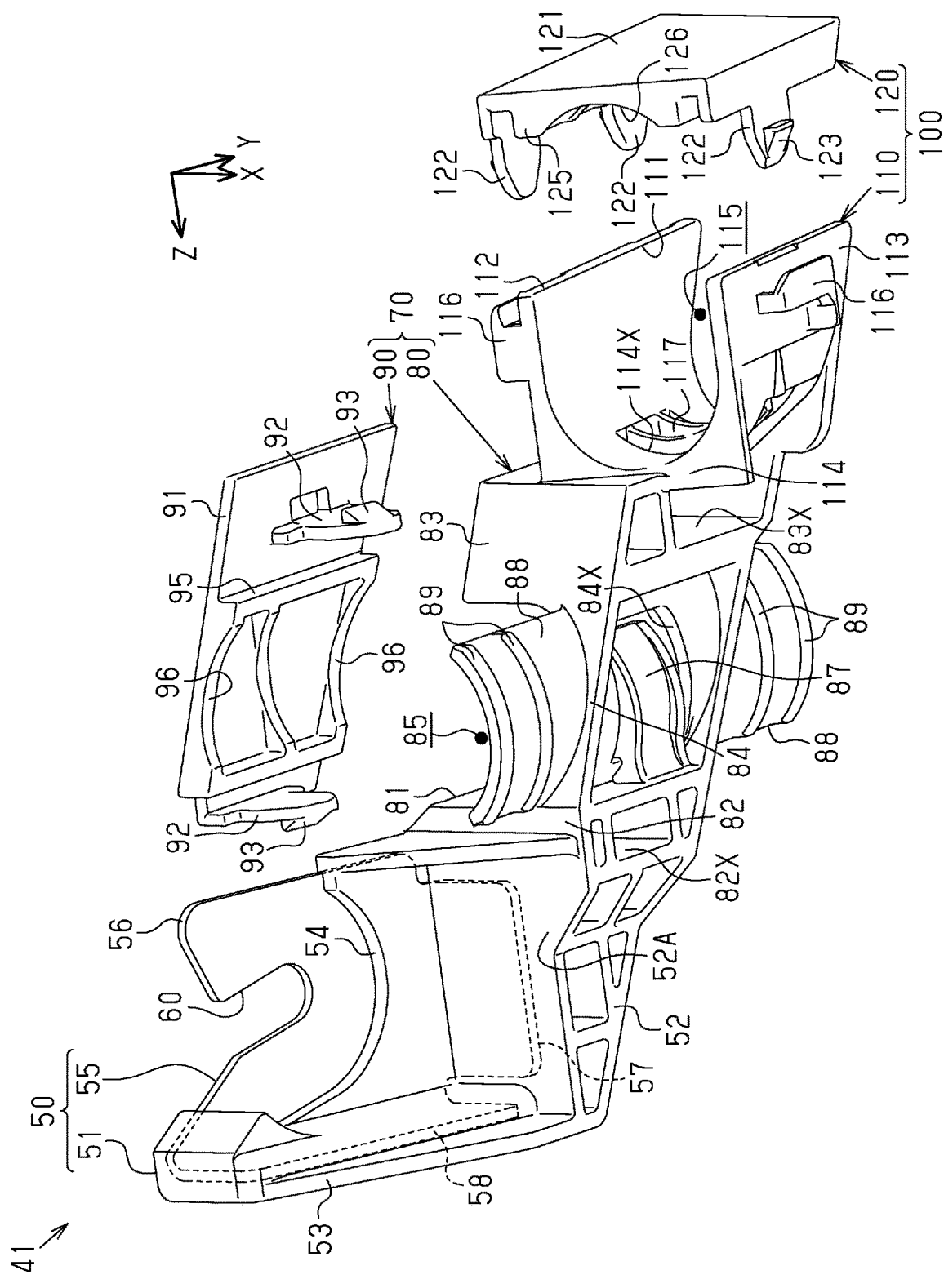
FIG. 5 is an exploded perspective view showing the clamp according to the embodiment.

As shown in FIG. 5, the base 51 includes a mount 54, on which a part of the fastening hardware 55 is mounted. The mount 54 protrudes, for example, in the Y-axis direction from the inner surface 52A of the holding wall 52. Further, the mount 54, for example, protrudes in the Z-axis direction from the inner surface oriented toward the holder 70 in the end surface of the holding wall 53 in the Z-axis direction. A part of the fastening hardware 55 is mounted on the upper surface of the mount 54. That is, the mount 54 supports the fastening hardware 55 from below in the figure. The upper surface of the mount 54 is located, for example, below the upper surfaces of the holding walls 52 and 53. The upper surface of the mount 54 is located, for example, below the upper surfaces of the holding walls 52 and 53 by an amount corresponding to the thickness of the fastening hardware 55. Thus, as shown in FIG. 4, the upper surface of the fastening hardware 55 on the upper surface of the mount 54 is located on the same plane of the upper surfaces of the holding walls 52 and 53.

As shown in FIG. 5, the fastening hardware 55 includes a fixed plate 56, a protrusion 57, which protrudes in the X-axis direction from one end of the lower surface of the fixed plate 56 in the Y-axis direction, and a protrusion 58, which protrudes in the X-axis direction from one end of the lower surface of the fixed plate 56 in the Z-axis direction. The fastening hardware 55 of the present embodiment is a single component that integrally includes the fixed plate 56, the protrusion 57, and the protrusion 58.

A part of the fixed plate 56 is mounted on the upper surface of the mount 54. The protrusion 57 is embedded in, for example, the holding wall 52. The protrusion 58 is embedded in, for example, the holding wall 53. Embedding the protrusions 57 and 58 in the holding walls 52 and 53 securely fixes the fastening hardware 55 to the base 51.

Figure 6:
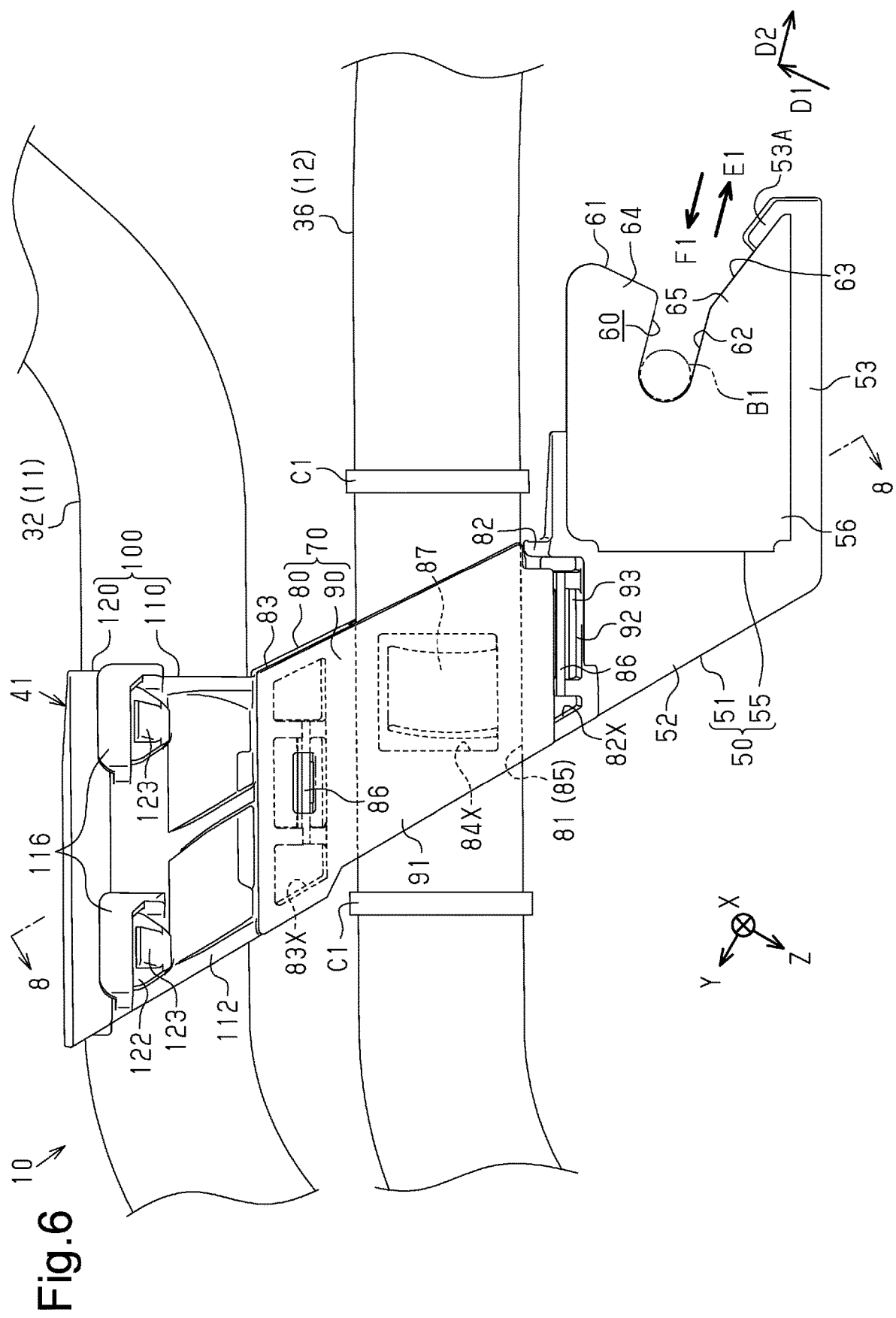
FIG. 6 is a plan view schematically showing the wire harness according to the embodiment.

As shown in FIG. 6, the fixed plate 56 includes the insertion groove 60, into which the fastener B1 on the vehicle body panel P1 (refer to FIG. 3) is inserted. The insertion groove 60 extends through, for example, the fastening hardware 55 in the thickness direction of the fastening hardware 55. The insertion groove 60 has a non-annular shape with the mouth 61 in the plan view seen in the X-axis direction. That is, the insertion groove 60 opens toward one side in the plan view seen in the X-axis direction. In other words, the insertion groove 60 is provided by cutting out one end surface of the fixed plate 56 in the Y-axis direction. More specifically, the insertion groove 60 is provided by cutting out the end surface of the fixed plate 56 in the Y-axis direction opposite from the holding wall 52. The insertion groove 60 extends from the mouth 61 toward the holding wall 52. The insertion groove 60 is, for example, U-shaped or C-shaped in the plan view seen in the X-axis direction.

The mouth 61 has an opening direction E1 (second direction), which is set as, for example, the Y-axis direction. The opening direction E1 of the mouth 61 of the present embodiment is set to be orthogonal to the extension direction of the fastener B1 on the installation surface P1a (refer to FIG. 3) with the clamp 41 fixed to the installation surface P1a. The opening direction E1 of the mouth 61 of the present embodiment is set so as to be parallel to the second installation direction D2 of the clamp 41. The fastener B1 is inserted into the insertion groove 60, for example, in the Y-axis direction from the mouth 61 toward the holding wall 52. For example, an insertion direction F1 of the fastener B1 into the insertion groove 60 is set so as to be parallel to the second installation direction D2 of the clamp 41. The fastener B1 can also be inserted into the insertion groove 60 in the X-axis direction.

The insertion groove 60 includes a groove portion 62, which is arranged rearward in the insertion direction F1 (leftward in the figure), and a guide 63, which is arranged at the mouth 61 frontward (rightward in the figure) in the insertion direction F1. In the insertion groove 60, the groove portion 62 and the guide 63 are continuous with each other. The groove portion 62 extends, for example, straight from the end of the guide 63 toward the holding wall 52. The opening width (i.e., the dimension in the Z-axis direction) of the groove portion 62 is fixed over the entire length in the insertion direction F1. The diameter of the opening of the groove portion 62 is set to be larger than the outer diameter of the fastener B1. The rear end of the groove portion 62 in the second installation direction D2 (i.e., the bottom of the insertion groove 60) is, for example, arcuate in correspondence with the outer circumferential surface of the fastener B1, which is columnar. In the plan view seen in the X-axis direction, the bottom of the insertion groove 60 is recessed in an arcuate manner toward the holding wall 52.

For example, the opening width of the guide 63 increases as the guide 63 becomes farther from the groove portion 62. The guide 63 includes a first guide 64 and a second guide 65. The first guide 64 is arranged on the rear side of the clamp 41 in the first installation direction D1 (upper side in the figure) when the guide 63 is positioned such that the clamp 41 is installed on the vehicle body panel P1 (refer to FIG. 3). The second guide 65 is arranged on the front side of the clamp 41 in the first installation direction D1 (lower side in the figure) when the guide 63 is positioned such that the clamp 41 is installed on the vehicle body panel P1 (refer to FIG. 3). For example, the guide 63 is provided such that the distance between the first guide 64 and the second guide 65 continuously increases as the guide 63 becomes farther from the groove portion 62. For example, the guide 63 is provided such that the distance between the first guide 64 and the second guide 65 increases toward the opposite sides in the Z-axis direction as the guide 63 becomes farther from the groove portion 62. The surface of the first guide 64 oriented toward the second guide 65 is inclined. The surface of the second guide 65 oriented toward the first guide 64 is inclined.

The dimension of the first guide 64 in the second installation direction D2 is set to be, for example, smaller than that of the second guide 65 in the second installation direction D2. The distal end of the second guide 65 is located so as not to overlap the first guide 64 in the Z-axis direction. In the present embodiment, the distal end of the second guide 65 (i.e., the front end in the second installation direction D2) is covered by a cover 53A, which is provided on the distal end of the holding wall 53. The cover 53A, for example, surrounds the distal end of the second guide 65. The dimension of the first guide 64 in the second installation direction D2 is set to be smaller than that of the part of the second guide 65 exposed from the cover 53A in the second installation direction D2.

In the plan view seen in the X-axis direction, the fastening hardware 55 of the present embodiment protrudes further than the holders 70 and 100 toward one side in the Y-axis direction (downward in the figure). For example, in the plan view seen in the X-axis direction, the fastening hardware 55 protrudes further than the holders 70 and 100 in the second installation direction D2 of the clamp 41. For example, when viewed in the Z-axis direction, the fastening hardware 55 is located so as not to overlap the holders 70 and 100. For example, when viewed in the Z-axis direction, the insertion groove 60 of the fastening hardware 55 is located so as not to overlap the holders 70 and 100.

Structure of Holder 70

The structure of the holder 70 will now be described.

Figure 7:
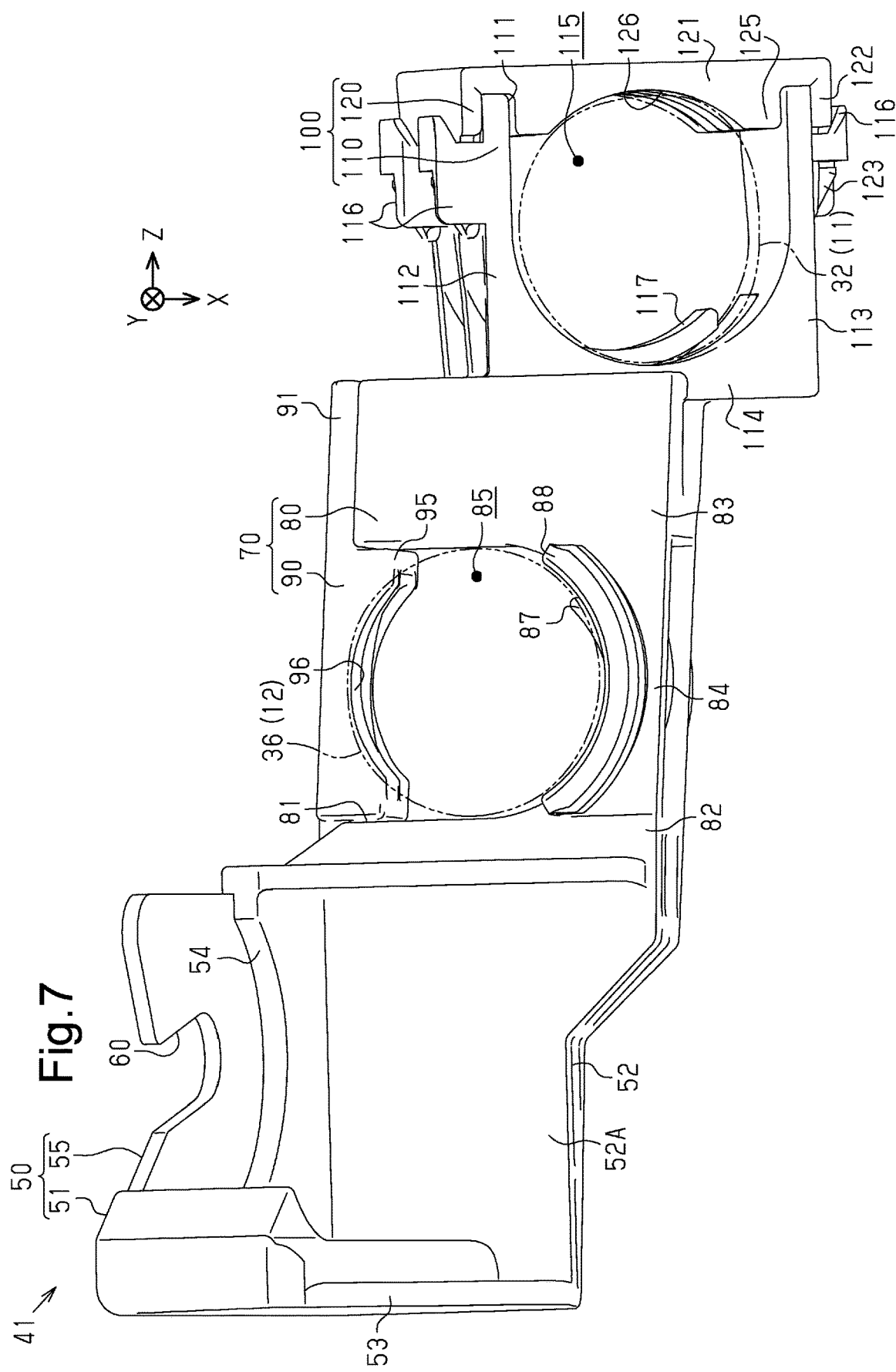
FIG. 7 is a front view schematically showing the wire harness according to the embodiment.

As shown in FIG. 7, the holder 70 includes an accommodation portion 80 and a cover 90. The accommodation portion 80 includes a mouth 81, into which the conductive passage 12 is inserted. The cover 90 is attached to the accommodation portion 80 so as to cover the mouth 81. The holder 70, which is tubular, is configured by attaching the cover 90 to the accommodation portion 80 so as to cover the mouth 81. The holder 70, for example, surrounds the entire outer circumference of the outer sheath 36 of the conductive passage 12 in the circumferential direction. In the holder 70 of the present embodiment, the accommodation portion 80 and the cover 90 are separate components. The cover 90 is, for example, attachable to and detachable from the accommodation portion 80. Examples of the material of the accommodation portion 80 include synthetic plastic such as polyolefin, polyamide, polyester, and ABS plastic. Examples of the material of the cover 90 include synthetic plastic such as polyolefin, polyamide, polyester, and ABS plastic. The material of which the cover 90 is made may be the same as or different from the material of which the accommodation portion 80 is made.

As shown in FIG. 4, the accommodation portion 80 includes a holding wall 82 and a holding wall 83, which hold the opposite sides of the outer sheath 36 in the Z-axis direction, and a holding wall 84, which holds the outer sheath 36 on the lower side in the figure in the X-axis direction. The holding walls 82 and 83, for example, have a predetermined width in the Z-axis direction and spread in the X-axis direction and the Y-axis direction. The holding wall 82 is, for example, provided integrally and continuously with the holding wall 52 of the fixed portion 50. The holding wall 84 connects the lower ends of the holding walls 82 and 83. The holding wall 84, for example, has a predetermined thickness in the X-axis direction and spreads in the Y-axis direction and the Z-axis direction. The inner surface of the holding wall 82, the inner surface of the holding wall 83, and the inner surface of the holding wall 84 surround an accommodation space 85, which accommodates the conductive passage 12. The accommodation space 85, for example, has the shape of a groove and extends through the holder 70 in the Y-axis direction.

The inner surfaces of the holding walls 82 and 83 are, for example, flat. The inner surface of the holding wall 82 and the inner surface of the holding wall 83 are, for example, parallel to each other. The inner surface of the holding wall 84 is, for example, curved. The inner surface of the holding wall 84 is, for example, arcuate in correspondence with the shape of the outer sheath 36 of the outer circumferential surface, which is tubular. The inner surfaces of the holding walls 82, 83, and 84 function as holding surfaces capable of holding the outer circumference of the outer sheath 36.

The holding wall 82 and the holding wall 83 are not connected to each other at the upper ends of the holding wall 82 and the holding wall 83 opposite from the holding wall 84 in the X-axis direction. The portion where the holding wall 82 and the holding wall 83 are not connected to each other is provided with the mouth 81, which opens upward in the figure. The mouth 81 opens, for example, in the direction (hereinafter referred to as "opening direction E2") orthogonal to the longitudinal direction of the outer sheath 36. The mouth 81 is provided such that the outer sheath 36 is insertable into the holder 70 (accommodation space 85). The opening direction E2 of the mouth 81 is set to be, for example, perpendicular to the installation surface P1a (refer to FIG. 3) with the clamp 41 fixed to the installation surface P1a. The opening direction E2 of the mouth 81 is set to be, for example, parallel to the X-axis direction, in which the fastener B1 (refer to FIG. 3) on the installation surface P1a extends. The opening direction E2 of the mouth 81 of the present embodiment is set to be oriented toward the installation surface P1a (refer to FIG. 3) in the X-axis direction with the clamp 41 fixed to the installation surface P1a. The outer sheath 36 is inserted into the mouth 81 in an axis orthogonal direction orthogonal to the axial direction of the outer sheath 36. The outer sheath 36 is inserted from the mouth 81 into the accommodation portion 80 in an axis orthogonal direction orthogonal to the axial direction of the holder 70. The cover 90 is attached to the accommodation portion 80 so as to cover the entire mouth 81.

As shown in FIG. 6, in the plan view seen in the X-axis direction, the accommodation portion 80 of the present embodiment extends with the accommodation portion 80 inclined with respect to both the Y-axis direction and the Z-axis direction. In the example shown in FIG. 6, the accommodation portion 80 extends with the accommodation portion 80 inclined diagonally upward in the figure.

The upper surfaces of the holding walls 82 and 83 are respectively provided with insertion grooves 82X and 83X, into which engagement portions 92 on the cover 90 are insertable. The insertion grooves 82X and 83X each include, for example, a lock frame 86, with which an engagement tab 93 of the engagement portion 92 is engaged. The lock frame 86 is, for example, substantially U-shaped and centrally includes an engagement hole with which the engagement tab 93 is engageable.

As shown in FIG. 4, a biasing portion 87 is centrally provided in the holding wall 84 in the Y-axis direction. The biasing portion 87 biases the outer sheath 36, which is accommodated in the accommodation portion 80, toward the cover 90. The biasing portion 87 extends in, for example, the Z-axis direction. The biasing portion 87 includes the opposite ends in the Z-axis direction. For example, one of the ends, which is closer to the holding wall 82, is a fixed end, and the other one of the ends, which is closer to the holding wall 83, is a free end. In the same manner as the inner surface of the holding wall 84, the biasing portion 87 is arcuate. The biasing portion 87 is elastic. The biasing portion 87, for example, elastically holds the outer sheath 36 in cooperation with the cover 90. The biasing portion 87 is provided by, for example, providing a U-shaped through-hole 84X in the holding wall 84. The through-hole 84X, for example, extends through the holding wall 84 in the X-axis direction. The biasing portion 87 is provided by, for example, cutting and raising the holding wall 84, which is surrounded by the U-shaped through-hole 84X, toward the inner side of the accommodation space 85. Providing the through-hole 84X connects the inner side and the outer side of the accommodation portion 80. The through-hole 84X functions as a drain hole or a vent hole in the accommodation portion 80.

The ends of the holding wall 84 in the Y-axis direction are provided with protrusions 88, which further protrude in the Y-axis direction than the end surfaces of the holding walls 82 and 83 in the Y-axis direction. The accommodation portion 80 of the present embodiment includes the protrusions 88 at the opposite ends of the holding wall 84 in the Y-axis direction. The two protrusions 88 extend in the opposite directions in the Y-axis direction. Each protrusion 88 protrudes away from the accommodation space 85. Each protrusion 88 protrudes in the extension direction of the outer sheath 36 in which the outer sheath 36 is pulled out of the accommodation space 85.

Each protrusion 88 is, for example, provided integrally and continuously with the holding wall 84. Each protrusion 88 has the shape of, for example, a thin plate. Each protrusion 88 includes an inner surface (surface oriented upward in the figure) opposed to the outer sheath 36 and an outer surface arranged opposite from the inner surface. The inner surface and the outer surface of each protrusion 88 are, for example, curved. The inner surface and the outer surface of each protrusion 88 are, for example, arcuate in correspondence with the shape of the outer sheath 36 of the outer circumferential surface, which is tubular. The inner surface of each protrusion 88 is, for example, provided integrally and continuously with the inner surface of the holding wall 84 without any step.

As shown in FIG. 5, the outer surface of each protrusion 88 is provided with two projections 89, which protrude in the X-axis direction from the outer surface of the protrusion 88. The two projections 89 are spaced apart from each other by a predetermined distance in the Y-axis direction. Each projection 89 extends in the Z-axis direction. Each projection 89 extends along the outer surface of the protrusion 88 in the Z-axis direction over the entire length.

As shown in FIG. 3, cable ties C1 are used to fix the protrusions 88 to the outer sheath 36 of the conductive passage 12 pulled out of the accommodation space 85 (refer to FIG. 4). In other words, the outer sheath 36 is held on the protrusions 88 by winding the cable ties C1 around the protrusions 88 with the outer sheath 36. The cable ties C1 externally fasten the protrusions 88 and the outer sheath 36 by pressing the inner surfaces of the protrusions 88 against the outer circumferential surface of the outer sheath 36. This allows the position of the clamp 41 to be fixed in the longitudinal direction of the outer sheath 36. Each cable tie C1 is, for example, mounted between the two projections 89 on the outer surface of the corresponding protrusion 88. The projections 89 function as restriction members that restrict the cable tie C1 from moving in the Y-axis direction.

As shown in FIGS. 4 and 5, the cover 90 includes an opposed wall 91, one or more (two in this embodiment) engagement portions 92, and a protrusion 95. The opposed wall 91 is opposed to the holding walls 82, 83, and 84 of the accommodation portion 80. The engagement portions 92 are provided on the inner surface (lower surface in this embodiment) of the opposed wall 91. The protrusion 95 is provided on the inner surface of the opposed wall 91. The cover 90 of the present embodiment is a single component that integrally includes the opposed wall 91, the engagement portions 92, and the protrusion 95.

The opposed wall 91 is, for example, flat. The opposed wall 91, for example, covers the entire upper surface of the accommodation portion 80. For example, the opposed wall 91 covers the entire upper surface of the accommodation portion 80 other than the protrusions 88.

As shown in FIG. 6, for example, the opposed wall 91 is rectangular in the plan view seen in the X-axis direction. The opposed wall 91 of the present embodiment has the shape of a parallelogram corresponding to the shape of the accommodation portion 80 in the plan view seen in the X-axis direction.

As shown in FIG. 5, the two engagement portions 92 are provided in correspondence with the holding walls 82 and 83 of the accommodation portion 80, respectively. The two engagement portions 92 are, for example, located on the opposite sides of the protrusion 95 in the Z-axis direction. The two engagement portions 92 are, for example, located in the vicinity of the ends of the lower surface of the opposed wall 91 in the Z-axis direction. The engagement portions 92, for example, protrude in the X-axis direction from the lower surface of the opposed wall 91. Each engagement portion 92 includes a distal end provided with, for example, the engagement tab 93, which protrudes in the Z-axis direction. Each engagement portion 92 is, for example, cantilevered such that its distal end is a free end and its basal end on the side opposite from the distal end (i.e., the end connected to the lower surface of the opposed wall 91) is a fixed end. Each engagement portion 92 is, for example, capable of being flexed in the Z-axis direction through elastic deformation.

The protrusion 95, for example, protrudes in the X-axis direction from the lower surface of the opposed wall 91. The protrusion 95 is, for example, provided in correspondence with the accommodation space 85 of the accommodation portion 80. The protrusion 95 has a shape and size such that the protrusion 95 is capable of being fitted to the inner side of the accommodation space 85. The protrusion 95 has, for example, a frame shape. The protrusion 95, for example, has a rectangular shape corresponding to the shape of the accommodation space 85. For example, the outside dimension of the protrusion 95 in the Z-axis direction is set to be slightly smaller than the dimension of the accommodation space 85 in the Z-axis direction. The protrusion 95 extending in the Y-axis direction is provided, for example, such that the protrusion 95 is in contact with the inner surfaces of the holding walls 82 and 83 with the cover 90 attached to the accommodation portion 80. The protrusion 95, which is located on the end of the opposed wall 91 in the Y-axis direction, includes recesses 96. The recesses 96 are, for example, curved in an arcuate manner in correspondence with the shape of the outer circumferential surface of the outer sheath 36, which is tubular, and recessed toward the opposed wall 91. The inner circumferential surfaces of the recesses 96 function as holding surfaces capable of holding the outer circumference of the outer sheath 36 with the cover 90 attached to the accommodation portion 80.

Figure 8:
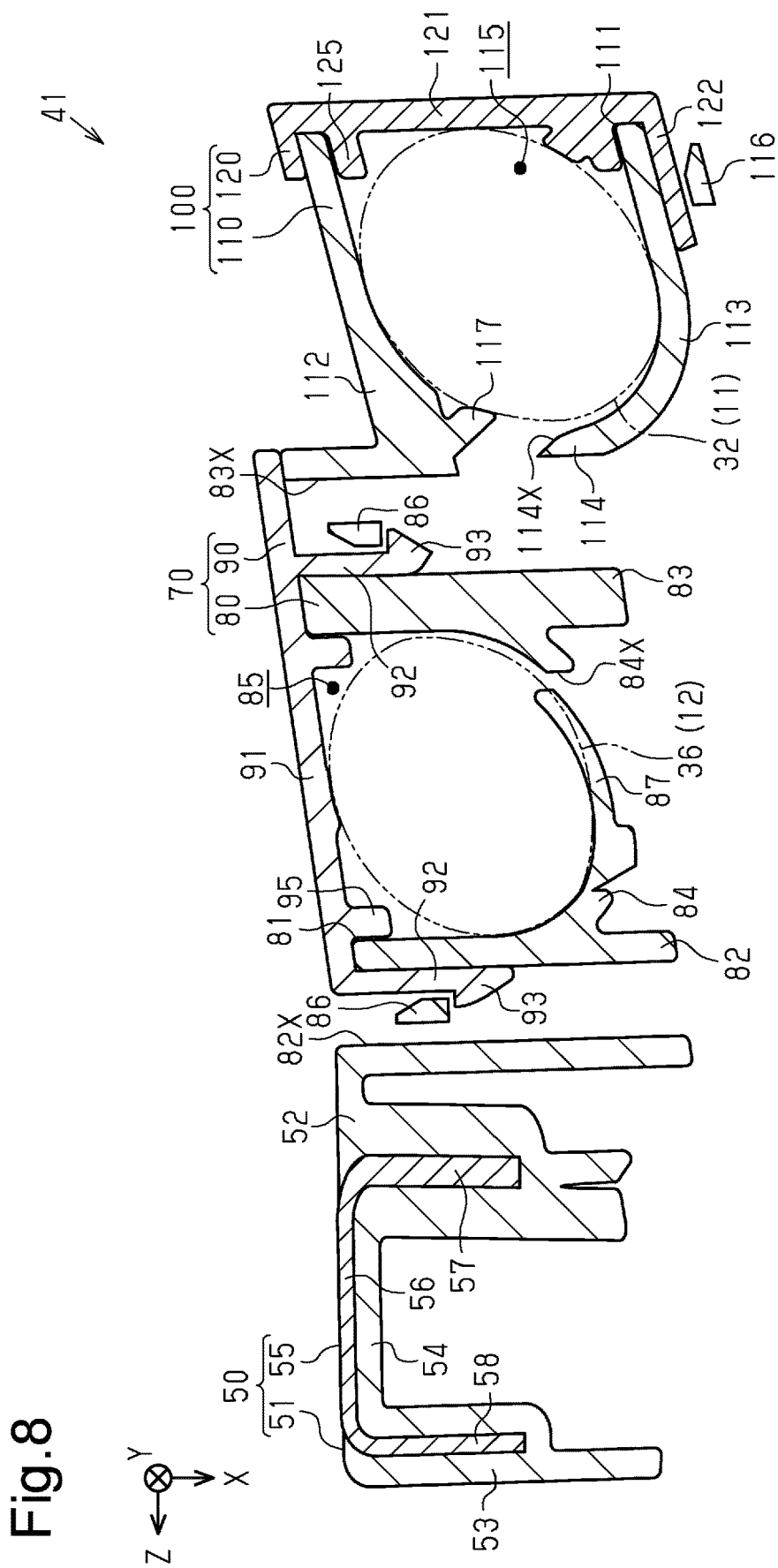
FIG. 8 is an end view schematically showing the wire harness according to the embodiment.

As shown in FIG. 8, when the cover 90 is attached to the accommodation portion 80, the engagement portions 92 are respectively inserted into the insertion grooves 82X and 83X of the holding walls 82 and 83 to engage the engagement tabs 93 of the engagement portions 92 with the lock frames 86. This allows the cover 90 to keep the mouth 81 closed. In the closed state, the protrusion 95 of the cover 90 is fitted to the inner side of the accommodation space 85 of the accommodation portion 80. In this state, the outer sheath 36 accommodated in the accommodation space 85 are pressed toward the holding wall 84 by the protrusion 95, and the outer sheath 36 is pressed toward the cover 90 by the biasing portion 87. Further, in the closed state, the accommodation portion 80 and the cover 90 (more specifically, the frame-shaped protrusion 95 and the lower surface of the opposed wall 91 surrounded by the protrusion 95) configure the holder 70, which is tubular and surrounds the outer circumference of the outer sheath 36.

Structure of Holder 100

As shown in FIG. 4, the holder 100 includes an accommodation portion 110 and a cover 120. The accommodation portion 110 includes a mouth 111, into which the conductive passage 11 is inserted. The cover 120 is attached to the accommodation portion 110 so as to cover the mouth 111. The holder 100, which is tubular, is configured by attaching the cover 120 to the accommodation portion 110 so as to cover the mouth 111. The holder 100, for example, surrounds the entire outer circumference of the outer sheath 32 of the conductive passage 11 in the circumferential direction. In the holder 100 of the present embodiment, the accommodation portion 110 and the cover 120 are separate components. The cover 120 is, for example, attachable to and detachable from the accommodation portion 110. Further, in the clamp 41 of the present embodiment, the cover 90 and the cover 120 are separate components. Examples of the material of the accommodation portion 110 include synthetic plastic such as polyolefin, polyamide, polyester, and ABS plastic. Examples of the material of the cover 120 include synthetic plastic such as polyolefin, polyamide, polyester, and ABS plastic. The material of which the cover 120 is made may be the same as or different from the material of which the accommodation portion 110 is made. The material of which the cover 120 is made may be the same as or different from the material of which the cover 90 is made.

The accommodation portion 110 includes a holding wall 112 and a holding wall 113, which hold the opposite sides of the outer sheath 32 in the X-axis direction, and a holding wall 114, which holds the outer sheath 32 on the left side in the figure in the Z-axis direction. The holding walls 112 and 113, for example, have a predetermined thickness in the X-axis direction and spread in the Y-axis direction and the Z-axis direction. The holding wall 112 is, for example, provided integrally and continuously with the holding wall 83 of the accommodation portion 80. The holding wall 114 connects the basal ends of the holding walls 112 and 113 (i.e., the ends closer to the holding wall 83). The holding wall 114, for example, has a predetermined thickness in the Z-axis direction and spreads in the X-axis direction and the Y-axis direction. The inner surface of the holding wall 112, the inner surface of the holding wall 113, and the inner surface of the holding wall 114 surround an accommodation space 115, which accommodates the conductive passage 11. The accommodation space 115, for example, has the shape of a groove and extends through the holder 100 in the Y-axis direction.

From another perspective, the accommodation portion 110 protrudes in the Z-axis direction from the outer surface (the end surface oriented rightward) of the holding wall 83. The holding wall 112 protrudes, for example, in the Z-axis direction from the outer surface of the holding wall 83.

The inner surfaces of the holding walls 112 and 113 are, for example, flat. The inner surface of the holding wall 112 and the inner surface of the holding wall 113 are, for example, parallel to each other. The inner surface of the holding wall 114 is, for example, curved. The inner surface of the holding wall 114 is, for example, arcuate in correspondence with the shape of the outer sheath 32 of the outer circumferential surface, which is tubular. The holding wall 114 is, for example, provided integrally and continuously with the holding wall 83. The inner surfaces of the holding walls 112, 113, and 114 function as holding surfaces capable of holding the outer circumference of the outer sheath 32.

The holding wall 112 and the holding wall 113 are not connected to each other at the right ends of the holding wall 112 and the holding wall 113 opposite from the holding wall 114 in the Z-axis direction. The portion where the holding wall 112 and the holding wall 113 are not connected to each other is provided with the mouth 111, which opens rightward in the figure. The mouth 111 opens, for example, in the direction (hereinafter referred to as "opening direction E3") orthogonal to the longitudinal direction of the outer sheath 32. The mouth 111 is provided such that the outer sheath 32 is insertable into the holder 100 (accommodation space 115). The opening direction E3 of the mouth 111 is set to, for example, intersect the opening direction E2 of the mouth 81. The opening direction E3 of the mouth 111 is set to be, for example, orthogonal to the opening direction E2 of the mouth 81. The opening direction E3 of the mouth 111 is set to be, for example, parallel to the installation surface P1*a* (refer to FIG. 3) with the clamp 41 fixed to the installation surface P1*a*. The opening direction E3 of the mouth 111 is set, for example, such that the opening direction E3 is not oriented toward the vehicle V such as the vehicle body panel P1 or P2 (refer to FIG. 3) of the vehicle V. The opening direction E3 of the mouth 111 is set to, for example, correspond to a direction (following direction) in which the conductive passage 11 moves as the first device M1 (inverter in this embodiment) in FIG. 1 connected to the conductive passage 11 is thrown during a vehicle collision. The opening direction E3 of the mouth 111 is set so as to be oriented upward in the vertical direction when the clamp 41 is fixed to the vehicle body panel P1. The outer sheath 32 is inserted into the mouth 111 in an axis orthogonal direction orthogonal to the axial direction of the outer sheath 36. The outer sheath 32 is inserted from the mouth 111 into the accommodation portion 110 in an axis orthogonal direction orthogonal to the axial direction of the holder 100. The cover 120 is attached to the accommodation portion 110 so as to cover the entire mouth 111.

As shown in FIG. 5, the accommodation portion 110 of the present embodiment is deviated from the accommodation portion 80 in the X-axis direction. The accommodation portion 110 protrudes, for example, downward in the figure from the lower surface of the accommodation portion 80. The upper surface of the accommodation portion 110 (i.e., the outer surface of the holding wall 112) is deviated downward in the figure from the upper surface of the accommodation portion 80 (i.e., the upper surface of the holding wall 83). In other words, the accommodation portion 80 further protrudes upward in the figure than the outer surface of the holding wall 112.

The outer surface of each of the holding walls 112 and 113 is provided with a lock frame 116, with which an engagement tab 123 of an engagement portion 122 on the cover 120 is engaged. The lock frames 116 are located at portions of the outer surfaces of the holding walls 112 and 113 closer to the mouth 111 in the Z-axis direction (rightward in the figure).

As shown in FIG. 4, two lock frames 116 are spaced apart from each other by a predetermined distance in the Y-axis direction on the outer surface of the holding wall 112 of the present embodiment. One lock frame 116 is centrally provided in the Y-axis direction on the outer surface of the holding wall 113 of the present embodiment. Each lock frame 116 is, for example, substantially U-shaped and centrally includes an engagement hole with which the corresponding engagement tab 123 is engageable. The lock frames 116 are, for example, provided separately from the lock frames 86, with which the engagement tabs 93 of the engagement portions 92 of the cover 90 are engaged.

As shown in FIG. 5, a biasing portion 117 is centrally provided in the holding wall 114 in the Y-axis direction. The biasing portion 117 biases the outer sheath 32, which is accommodated in the accommodation portion 110, toward the cover 120. The biasing portion 117 extends in, for example, the X-axis direction. The biasing portion 117 includes the opposite ends in the X-axis direction. For example, one of the ends, which is closer to the holding wall 112, is a fixed end, and the other one of the ends, which is closer to the holding wall 113, is a free end. In the same manner as the inner surface of the holding wall 114, the biasing portion 117 is arcuate. The biasing portion 117 is elastic. The biasing portion 117, for example, elastically holds the outer sheath 32 in cooperation with the cover 120.

The biasing portion 117 is provided by, for example, providing a U-shaped through-hole 114X in the holding wall 114. The through-hole 114X, for example, extends through the holding wall 114 in the Z-axis direction. The biasing portion 117 is provided by, for example, cutting and raising the holding wall 114, which is surrounded by the U-shaped through-hole 114X, toward the inner side of the accommodation space 115. The through-hole 114X is, for example, positioned so as to overlap an insertion groove 83X of the holding wall 83 in a plan view seen in the Z-axis direction. Providing the through-hole 114X connects the inner side and the outer side of the accommodation portion 110. The through-hole 114X functions as a drain hole or a vent hole in the accommodation portion 110.

The cover 120 includes an opposed wall 121, one or more (three in this embodiment) engagement portions 122, and a protrusion 125. The opposed wall 121 is opposed to holding walls 112, 113, and 114 of the accommodation portion 110. The engagement portions 122 are provided on the inner surface of the opposed wall 121. The protrusion 125 is provided on the inner surface of the opposed wall 121. The cover 120 of the present embodiment is a single component that integrally includes the opposed wall 121, the engagement portions 122, and the protrusion 125.

The opposed wall 121 is, for example, flat. The opposed wall 121, for example, covers the entire end surface of the accommodation portion 110, which is oriented rightward in the figure. The opposed wall 121 is, for example, rectangular in the plan view seen in the Z-axis direction.

The three engagement portions 122 are provided in correspondence with the three lock frames 116 on the holding walls 112 and 113. The three engagement portions 122 are, for example, located on the opposite sides of the protrusion 125 in the X-axis direction. The three engagement portions 122 are, for example, located in the vicinity of the ends in the X-axis direction on the inner surface of the opposed wall 121, which is opposed to the accommodation portion 110. The engagement portions 122 protrude in the Z-axis direction from the inner surface of the opposed wall 121. Each engagement portion 122 includes a distal end provided with, for example, the engagement tab 123, which protrudes in the X-axis direction. Each engagement portion 122 is cantilevered such that its distal end is a free end and its basal end on the side opposite from the distal end (i.e., the end connected to the inner surface of the opposed wall 121) is a fixed end. Each engagement portion 122 is capable of being flexed in the X-axis direction through elastic deformation.

The protrusion 125, for example, protrudes in the Z-axis direction from the inner surface of the opposed wall 121. The protrusion 125 is, for example, provided in correspondence with the accommodation space 115 of the accommodation portion 110. The protrusion 125 has a shape and size such that the protrusion 125 is capable of being fitted to the inner side of the accommodation space 115. The protrusion 125 has, for example, a frame shape. The protrusion 125, for example, has a rectangular shape corresponding to the shape of the accommodation space 115. For example, the outside dimension of the protrusion 125 in the X-axis direction is set to be slightly smaller than the dimension of the accommodation space 115 in the X-axis direction. The protrusion 125 extending in the Y-axis direction is provided, for example, such that the protrusion 125 is in contact with the inner surfaces of the holding walls 112 and 113 with the cover 120 attached to the accommodation portion 110. The protrusion 125, which is located on the end of the opposed wall 121 in the Y-axis direction, includes recesses 126. The recesses 126 are, for example, curved in an arcuate manner in correspondence with the shape of the outer circumferential surface of the outer sheath 32, which is tubular, and recessed toward the opposed wall 121. The inner circumferential surfaces of the recesses 126 function as holding surfaces capable of holding the outer circumference of the outer sheath 32 with the cover 120 attached to the accommodation portion 110.

As shown in FIG. 7, when the cover 120 is attached to the accommodation portion 110, the engagement tabs 123 of the engagement portions 122 are respectively engaged with the lock frames 116. This allows the cover 120 to keep the mouth 111 closed. In the closed state, the protrusion 125 of the cover 120 is fitted to the inner side of the accommodation space 115 of the accommodation portion 110. In this state, the outer sheath 32 accommodated in the accommodation space 115 are pressed toward the holding wall 114 by the protrusion 125, and the outer sheath 32 is pressed toward the cover 120 by the biasing portion 117. Further, in the closed state, the accommodation portion 110 and the cover 120 (more specifically, the frame-shaped protrusion 125 and the inner surface of the opposed wall 121 surrounded by the protrusion 125) configure the holder 100, which is tubular and surrounds the outer circumference of the outer sheath 32.

The force that fixes the cover 120 to the accommodation portion 110 is set to be substantially the same as the force that fixes the cover 90 to the accommodation portion 80. Further, the force that fixes the cover 120 to the accommodation portion 110 is, for example, smaller than the force that fixes the fixed portion 50 to the installation surface P1a.

The above-described covers 90 and 120 are separately attached to the accommodation portions 80 and 110, respectively. The covers 90 and 120 are individually attachable to and removable from the accommodation portions 80 and 110, respectively. The cover 90 is attached and fixed to the accommodation portion 80 in the X-axis direction. The cover 120 is attached and fixed to the accommodation portion 110 in the Z-axis direction. In this manner, in the clamp 41 of the present embodiment, the installation direction of the cover 90 and the installation direction of the cover 120 are set to be orthogonal to each other. Further, in the clamp 41 of the present embodiment, the cover 90 and the cover 120 are physically spaced apart from each other.

As shown in FIG. 3, the clamp 41 of the present embodiment is installed on the installation surface P1a of the vehicle body panel P1 such that the cover 120 is oriented upward in the vehicle up-down direction (Z-axis direction). That is, the clamp 41 is installed on the installation surface P1a of the vehicle body panel P1 such that the opening direction E3 of the accommodation portion 110 is oriented upward in the vehicle up-down direction (Z-axis direction). In this state, the cover 90 shown in FIG. 4 is opposed to the installation surface P1a.

As shown in FIG. 4, in the clamp 41 of the present embodiment, the holding walls 52 and 53 of the base 51 of the fixed portion 50, the holding walls 82, 83 and 84 of the accommodation portion 80, and the holding walls 112, 113, and 114 of the accommodation portion 110 are provided integrally and continuously with one another. As shown in FIG. 6, in the clamp 41, for example, the fixed portion 50, the holder 70, and the holder 100 are laid out in the direction intersecting both the X-axis direction and the Y-axis direction. For example, in the plan view seen in the X-axis direction, the fixed portion 50, the holder 70, and the holder 100 are laid out in the direction intersecting both the Y-axis direction and the Z-axis direction.

Structure of Clamp 42

The structure of the clamp 42 will now be described.

As shown in FIG. 3, the clamp 42 includes a holder 150, which holds the conductive passage 12, and a fixed portion 160, which is fixed to an installation surface P2a of the vehicle body panel P2. The holder 150, for example, is tubular and surrounds the entire outer circumference of the outer sheath 36 of the conductive passage 12 in the circumferential direction. The fixed portion 160 is provided on one end surface of the holder 150 (in this embodiment, on an upper surface 150A oriented upward in the Z-axis direction). The fixed portion 160 protrudes upward from the upper surface 150A of the holder 150. The fixed portion 160 is, for example, flat.

The clamp 42 is coupled to the conductive passage 12 at the extension 29 of the individual routed part. The clamp 42 is coupled to, for example, the outer circumferential surface of the outer sheath 36 in the conductive passage 12. The clamp 42 fixes the conductive passage 12 to, for example, the installation surface P2a of the vehicle body panel P2 at the extension 29. The installation surface P2a is, for example, located on a plane perpendicular to the installation surface P1a of the vehicle body panel P1. For example, a fastener B2 extends from the installation surface P2a perpendicularly to the installation surface P2a. The fastener B2 of the present embodiment extends in the Y-axis direction. That is, in the present embodiment, the fastener B2 and the fastener B1, which is provided on the installation surface P1a, extend in directions orthogonal to each other. The fastener B2 is, for example, cylindrical. The fastener B2 may be, for example, a bolt such as a stud bolt.

The fixed portion 160 includes an insertion hole 161, into which the fastener B2 is inserted. The insertion hole 161 extends through the fixed portion 50 in, for example, the direction in which the fastener B2 extends, that is, the Y-axis direction. The insertion hole 161 has the shape of, for example, a closed loop in a plan view seen in the Y-axis direction. The fastener B2 is inserted into the insertion hole 161 in the direction in which the fastener B2 extends (in this embodiment, in the Y-axis direction). That is, the installation direction D3 of the clamp 42 on installation surface P2a is oriented leftward in the figure in the Y-axis direction. The installation direction D3 is set to be parallel to the second installation direction D2. The clamp 42 is fixed to the installation surface P2a by mounting a nut (not shown) on the fastener B2 (bolt), which is columnar, with the fastener B2 inserted into the insertion hole 161.

The fastener B2 may be, for example, screwed and coupled to a hole in the vehicle body panel P2, welded to the vehicle body panel P2, or press-fitted to the vehicle body panel P2.

Method for Manufacturing Wire Harness 10

The method for manufacturing the wire harness 10 will now be described.

Figure 9:
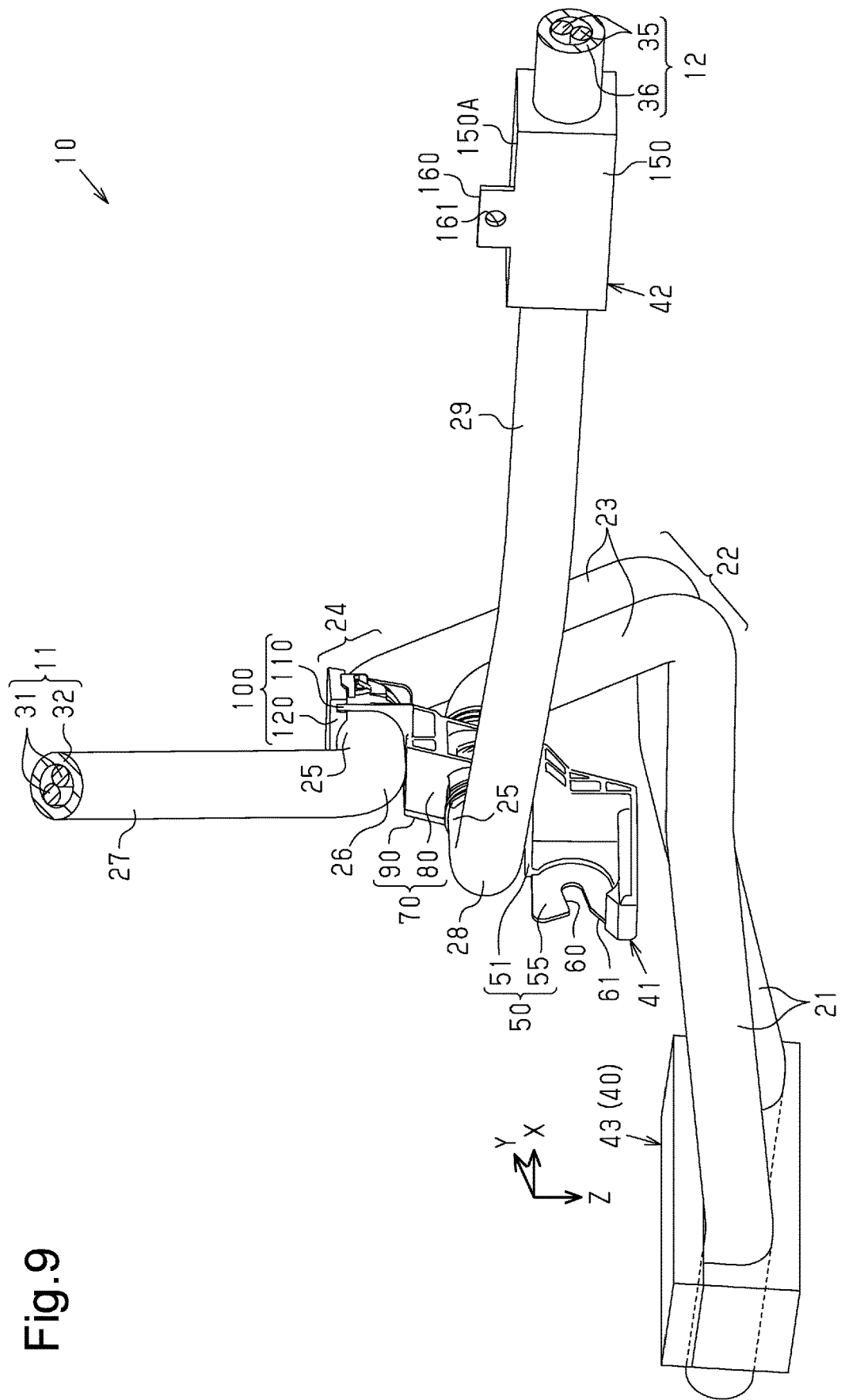
FIG. 9 is a perspective view schematically showing a method for manufacturing the wire harness according to the embodiment.

In the process shown in FIG. 9, first, the conductive passage 11 in which the outer sheath 32, which accommodates the electric wire 31, is bent and the conductive passage 12 in which the outer sheath 36, which accommodates the electric wire 35, is bent are prepared. That is, the conductive passage 11 including the extensions 21, 23, 25, and 27 and the bent portions 22, 24, and 26 and the conductive passage 12 including the extensions 21, 23, 25, and 29 and the bent portions 22, 24, and 28 are prepared.

Subsequently, multiple clamps 40 are coupled to the conductive passages 11 and 12. More specifically, the clamp 42 is coupled to the extension 29 of the conductive passage 12 at the individual routed part. Further, the clamp 41 is coupled to the extensions 25 of the conductive passages 11 and 12 at the parallel routed part, and a clamp 43 is coupled to the extensions 21 of the conductive passages 11 and 12 at the parallel routed part. At this time, the two conductive passages 11 and 12 are twisted and routed such that the direction in which the conductive passages 11 and 12 are laid out is changed in a section of the parallel routed part in the longitudinal direction. More specifically, the two conductive passages 11 and 12 are laid out in the Y-axis direction at the extensions 21 and laid out in the Z-axis direction at the extensions 25. Thus, the insertion direction of the conductive passages 11 and 12 into the clamp 43 coupled to the extension 21 cannot be set to be the same as the insertion direction of the conductive passages 11 and 12 into the clamp 41 coupled to the extension 25. In more detail, at the extensions 21, the two conductive passages 11 and 12 are routed in parallel in the Y-axis direction. Thus, setting the insertion direction of the conductive passages 11 and 12 into the clamp 43 as the Z-axis direction allows the two conductive passages 11 and 12 to be collectively inserted into the clamp 43 in the same direction. At the extensions 25, since the two conductive passages 11 and 12 are routed in parallel in the Z-axis direction, the insertion directions of the two conductive passages 11 and 12 into the clamp 41 cannot be set as the Z-axis direction. For example, setting the insertion direction of the conductive passages 11 and 12 into the clamp 41 as the X-axis direction allows the two conductive passages 11 and 12 to be collectively inserted into the clamp 41 in the same direction. However, in this case, the insertion direction of the conductive passages 11 and 12 into the clamp 43 differs from the insertion direction of the conductive passages 11 and 12 into the clamp 41. This complicates the task of installing the conductive passages 11 and 12 on the clamps 41 and 43.

To solve this problem, in the clamp 41 of the present embodiment, the insertion direction of the conductive passage 11 into the accommodation portion 110 (i.e., the opening direction E3 of the accommodation portion 110) is set as the Z-axis direction, and the insertion direction of the conductive passage 12 into the accommodation portion 80 (i.e., the opening direction E2 of the accommodation portion 80) is set as the X-axis direction. That is, in the clamp 41 of the present embodiment, the insertion direction of one conductive passage 11 into the clamp 41 is set to be parallel to the insertion direction of the conductive passages 11 and 12 into the clamp 43. This allows the insertion direction of the conductive passage 11 into the clamp 41 to be set to be parallel to the insertion direction of the conductive passage 11 into the clamp 43. This improves the efficiency of installing the clamps 41 and 43 on the conductive passage 11.

The wire harness 10 is manufactured using the above-described manufacturing process.

Method for Installing Wire Harness 10 on Vehicle Body.

Figure 10A:
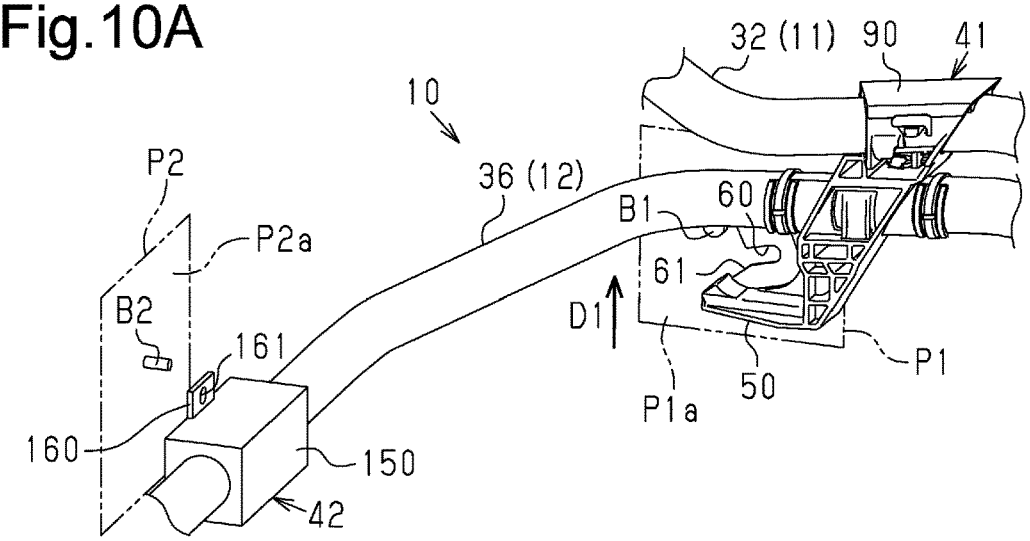
FIG. 10A is a perspective view schematically showing a method for manufacturing the wire harness according to the embodiment.

Next, in the process shown in FIG. 10A, in order to couple the wire harness 10 to the vehicle body, the clamp 41 is brought close to the installation surface P1a of the vehicle body panel P1 and the clamp 42 is brought close to the installation surface P2a of the vehicle body panel P2.

Figure 10B:
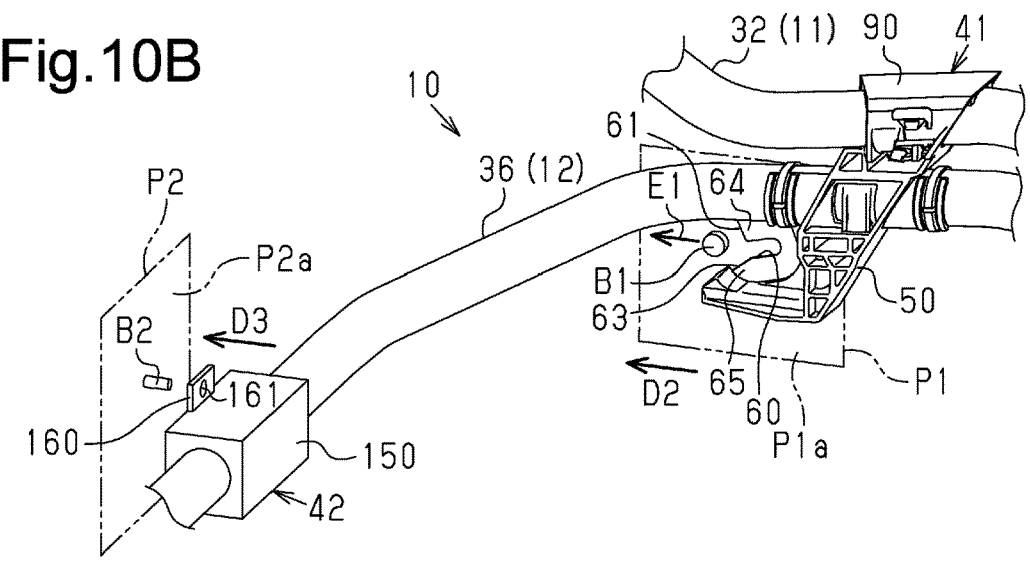
FIG. 10B is a perspective view schematically showing a method for manufacturing the wire harness according to the embodiment.

Then, the entire wire harness 10 is moved upward in the Z-axis direction. That is, the entire wire harness 10 is moved in the first installation direction D1. More specifically, as shown in FIG. 10B, the entire wire harness 10 is moved in the first installation direction D1 such that the fastener B2 on the installation surface P2a overlaps the insertion hole 161 of the clamp 42 in the plan view seen in the Y-axis direction. At this time, the fixed portion 50 of the clamp 41 is located away from the fastener B1 on the installation surface P1a in the opposite direction of the second installation direction D2. Further, the fixed portion 160 of the clamp 42 is located away from the fastener B2 on the installation surface P2a in the opposite direction of an installation direction D3. The dimension of the first guide 64, which is located on the rear side in the first installation direction D1, in the second installation direction D2 is set to be smaller than the dimension of the second guide 65, which is located on the front side in the first installation direction D1, in the second installation direction D2. Thus, this process restricts the first guide 64 from contacting the fastener B1.

Figure 10C:
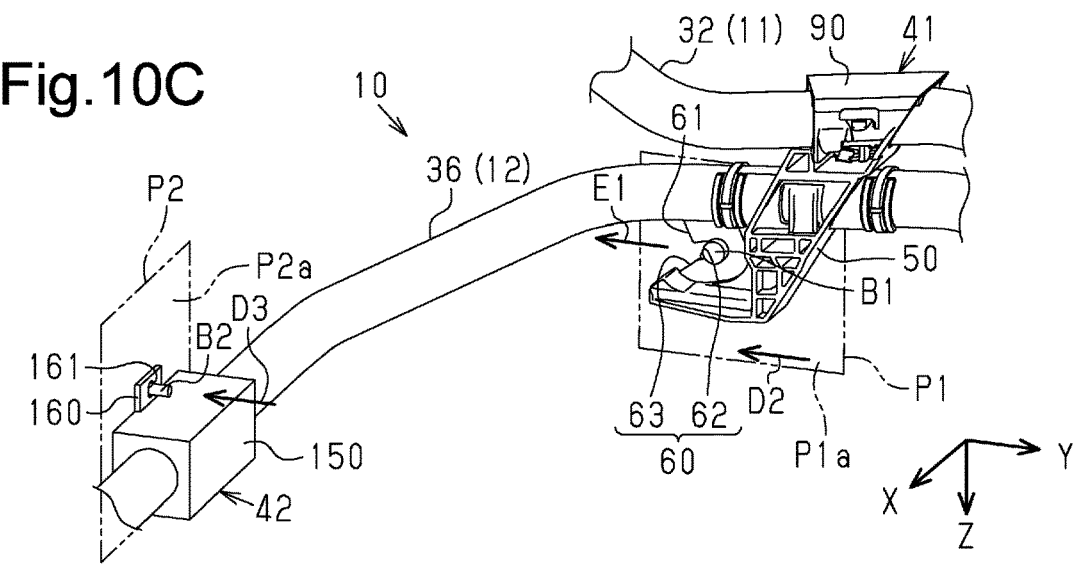
FIG. 10C is a perspective view schematically showing a method for manufacturing the wire harness according to the embodiment.

Next, the entire wire harness 10 is moved leftward in the Y-axis direction. That is, the entire wire harness 10 is moved in the second installation direction D2 and the installation direction D3, which are set so as to be parallel to each other. At this time, the opening direction E1 of the mouth 61 of the insertion groove 60 is set so as to be parallel to the second installation direction D2 and the installation direction D3. Thus, as shown in FIG. 10C, the fastener B1 is inserted into the insertion groove 60 of the clamp 41 in the second installation direction D2 and the fastener B2 is inserted into the insertion hole 161 of the clamp 42 in the installation direction D3. Thus, in this process, the fasteners B1 and B2, which extend in the directions orthogonal to each other, are collectively inserted into the insertion groove 60 and the insertion hole 161, respectively. The clamp 41 includes the guide 63, which is located on the front side in the direction in which the fastener B1 is inserted into the insertion groove 60. Thus, in the state shown in FIG. 10B, the fastener B1 can be guided into the groove portion 62 by the guide 63 even if the position of the clamp 41 in the Z-axis direction is slightly deviated from a desired position.

Afterwards, mounting a nut on the fastener B1 (bolt) fixes the clamp 41 to the installation surface P1a, and mounting a nut on the fastener B2 (bolt) fixes the clamp 42 to the installation surface P2a.

The present embodiment has the following advantages.

(1) The fixed portion 50 of the clamp 41 includes the insertion groove 60, into which the columnar fastener B1 on the vehicle body panel P1 is inserted. The insertion groove 60 extends through the fixed portion 50 in the first direction (X-axis direction in this embodiment). The insertion groove 60 is shaped so as to include the mouth 61 in the plan view seen in the X-axis direction. The mouth 61 opens in the second direction (Y-axis direction in this embodiment), which is orthogonal to the X-axis direction.

This structure allows the columnar fastener B1 to be inserted into the insertion groove 60 in the X-axis direction and also allows the columnar fastener B1 to be inserted into the insertion groove 60 in the Y-axis direction. That is, the columnar fastener B1 is insertable into the insertion groove 60 in two directions. Thus, as compared with an insertion hole having the shape of a closed loop, the number of directions in which the clamp 41 can be installed on the vehicle body panel P1 is increased. This improves the degree of freedom in the installation direction and thus improves the efficiency of installing the clamp 41 on the vehicle body panel P1.

(2) The mouth 61 includes the guide 63, which guides the fastener B1 toward the rear side in the insertion direction F1, which is parallel to the Y-axis direction. The guide 63 is inclined such that the opening width of the insertion groove 60 increases from the rear side in the insertion direction F1 toward the front side in the insertion direction F1.

In this structure, when the fastener B1 is inserted into the insertion groove 60 in the insertion direction F1, which is parallel to the Y-axis direction, the fastener B1 is guided toward the rear side in the insertion direction F1 along the inclined surface of the guide 63. This facilitates the inserting of the fastener B1 into the rear end (i.e., bottom) of the insertion groove 60 in the insertion direction F1. Further, the guide 63 increases the opening width of the insertion groove 60. Thus, when the fastener B1 is inserted into the insertion groove 60, the fastener B1 can be inserted into the bottom of the insertion groove 60 by the guide 63 even if the position of the bottom of the insertion groove 60 relative to the fastener B1 is slightly deviated. This improves the efficiency of installing the clamp 41 on the vehicle body panel P1.

(3) The clamp 41 is moved in directions of two steps including the first installation direction D1 and the second installation direction D2 so that the clamp 41 is installed on the vehicle body panel P1. The second installation direction D2 intersects the first installation direction D1 and is parallel to the insertion direction F1. The guide 63 includes the first guide 64, which is located on the rear side in the first installation direction D1 when the guide 63 is positioned to be installed on the vehicle body panel P1, and the second guide 65, which is located on the front side in the first installation direction D1 when the guide 63 is positioned to be installed on the vehicle body panel P1. The dimension of the first guide 64 in the second installation direction D2 is set to be smaller than that of the second guide 65 in the second installation direction D2.

In this structure, when the clamp 41 is moved in the first installation direction D1, the dimension of the first guide 64 in the second installation direction D2, which is likely to contact the fastener B1 at an earlier timing, is set to be smaller than that of the second guide 65 in the second installation direction D2. Thus, when the clamp 41 is moved in the first installation direction D1, the first guide 64 is restricted from contacting the fastener B1. This restricts the clamp 41 from moving in the first installation direction D1.

(4) The insertion groove 60 is located in the plan view seen in the X-axis direction such that the insertion groove 60 protrudes further than the holders 70 and 100 in the second installation direction D2. In this structure, the holders 70 and 100 are located rearward from the insertion groove 60 in the opposite direction of the second installation direction D2. Thus, when the clamp 41 is moved in the second installation direction D2, the holders 70 and 100 are restricted from contacting the fastener B1. This reduces the damage to the holders 70 and 100 and restricts the clamp 41 from moving in the second installation direction D2.

(5) The fixed portion 50 includes the plastic base 51, which is provided integrally with the holders 70 and 100, and the fixed plate 56, which is held on the base 51. The fixed plate 56 is made of a metal material having a higher rigidity than the material of which the base 51 is made. The fixed plate 56 includes the insertion groove 60.

In this structure, a high strength is ensured in the fixed plate 56 of the clamp 41, which is fixed to the installation surface P1a of the vehicle body panel P1. Thus, the clamp 41 can be securely fixed to the installation surface P1a of the vehicle body panel P1 using, for example, a bolt as the fastener B1 and a nut that is to be mounted on the bolt. This improves the connection reliability of the clamp 41 to the vehicle body panel P1.

(6) The clamp 41 includes the holder 70, which holds the outer sheath 36 accommodating the electric wire 35, and the holder 100, which holds the outer sheath 32 accommodating the electric wire 31. The fixed portion 50, the holder 70, and the holder 100 are laid out in the direction intersecting both the X-axis direction and the Y-axis direction.

In this structure, the holders 70 and 100 are not arranged on an extension line extending in the X-axis direction from the insertion groove 60, and the holders 70 and 100 are not arranged on an extension line extending in the Y-axis direction from the insertion groove 60. Thus, both when the fastener B1 is inserted into the insertion groove 60 in the X-axis direction and when the fastener B1 is inserted into the insertion groove 60 in the Y-axis direction, the fastener B1 is restricted from contacting the holder 70 and the holder 100.

(7) The clamp 41 is coupled to the outer sheaths 32 and 36 in the portion where the outer sheaths 32 and 36 are routed in parallel to each other. The clamp 42 is coupled to the outer sheath 36. The clamp 41 is fixed to the installation surface P1a of the vehicle body panel P1. The clamp 42 is fixed to the installation surface P2a on the plane perpendicular to the installation surface P1a In this structure, the clamp 41 and the clamp 42 are respectively fixed to the installation surface P1a and the installation surface P2a on the planes orthogonal to each other. In such an installation, the direction in which the clamp 41 is installed on the installation surface P1a and the direction in which the clamp 42 is installed on the installation surface P2a are normally orthogonal to each other. Thus, when a typical insertion hole having the shape of a closed loop is used, a fastener is inserted into the insertion hole only in a single direction. This makes it difficult to couple the clamps 41 and 42 to the installation surfaces P1a and P2a, respectively. In the present embodiment, the clamp 41 allows the fastener B1 to be inserted into the insertion groove 60 in two directions. Thus, for example, inserting the fastener B1 on the installation surface P1a into the insertion groove 60 in the Y-axis direction allows the clamp 41 and the clamp 42 to be installed on the installation surface P1a and the installation surface P2a on the planes orthogonal to each other.

(8) The holder 70 of the clamp 41 includes the mouth 81, which opens in the opening direction E2 orthogonal to the longitudinal direction of the outer sheath 36 and allows the outer sheath 36 to be inserted into the holder 70. The holder 100 includes the mouth 111, which opens in the opening direction E3 orthogonal to the longitudinal direction of the outer sheath 32 and allows the outer sheath 32 to be inserted into the holder 100. The opening direction E2 and the opening direction E3 are set to intersect each other.

In this structure, the outer sheath 36 and the outer sheath 32 are respectively inserted into the holder 70 and the holder 100 in insertion directions that differ from each other. This allows the outer sheath 36 and the outer sheath 32 to be removed from the holder 70 and the holder 100 in the directions that differ from each other. In other words, the outer sheath 36 and the outer sheath 32 can be easily removed from the clamp 41 in an individual manner.

For example, during a vehicle collision, when the first device M1 (for example, inverter) connected to the electric wire 31 moves from the original installation position due to the collision, the electric wire 31 and the outer sheath 32 may move in an unintended direction (hereinafter referred to as "following direction") as the first device M1 moves. To solve this problem, for example, the opening direction E3 of the mouth 111 of the holder 100 is set to be oriented toward the following direction of the electric wire 31 and the outer sheath 32. This allows the outer sheath 32 to easily fall from the clamp 41 separately from the outer sheath 36 when the outer sheath 32 moves in the following direction. Thus, even if the electric wire 31 and the outer sheath 32 move in the following direction during a vehicle collision, the clamp 41 and the electric wire 35 are restricted from moving together in the following direction as the electric wire 31 and the outer sheath 32 move. This restricts the wire harness 10 from being damaged during a vehicle collision.

(9) The holder 70 includes the cover 90, which covers the mouth 81. The holder 100 includes the cover 120, which covers the mouth 111. The cover 90 and the cover 120 are separate components.

In this structure, since the cover 90 and the cover 120 are separate components, the covers 90 and 120 can be set to open states, that is, the mouths 81 and 111 can be opened.

For example, when the cover 90 and the cover 120 are integrally provided, it is difficult to open only one of the mouth 81 and the mouth 111. Further, for example, when a single cover that covers the mouths 81 and 111 with different opening directions E2 and E3 are coupled to the accommodation portions 80 and 110, the cover is fixed (for example, engaged) in multiple directions. Thus, when the covers 90 and 120 are integrally provided, the covers 90 and 120 are not easily removed by an external force acting in a single direction. Thus, when the covers 90 and 120 are integrally provided, the covers 90 and 120 are not easily removed only by a pressing force acting in the following direction from the outer sheath 32. In this case, when the outer sheath 32 moves in the following direction, the movement is hindered by the integrated cover. This causes the clamp 41 and the outer sheath 36 including the cover to move together as the outer sheath 32 moves.

In the clamp 41 of the present embodiment, the cover 90 and the cover 120 are separate components. Thus, the fixing direction (for example, engagement direction) in which the cover 120 is attached so as to cover the mouth 111 can be set as a single direction (Z-axis direction in this embodiment). Accordingly, as compared with when the cover 90 and the cover 120 are integrally provided, the cover 120 is easily removed by a pressing force acting in the following direction from the outer sheath 32. This restricts the clamp 41 and the outer sheath 36 from moving in the following direction as the outer sheath 32 moves in the following direction.

(10) The holder 100 includes the cover 120 and the accommodation portion 110, which includes the mouth 111 and accommodates the outer sheath 32. The accommodation portion 110 and the cover 120 are separate components. In this structure, since the accommodation portion 110 and the cover 120 are separate components, the cover 120 can be removed from the accommodation portion 110 (i.e., the clamp 41). Thus, when the outer sheath 32 moves in the following direction, the clamp 41 and the outer sheath 36 are restricted from moving together with the cover 120 as the outer sheath 32 moves.

(11) The holder 70 includes one end connected to the fixed portion 50 and the other end connected to the holder 100. The opening direction E3 of the mouth 111 of the holder 100 is set so as to be oriented away from the holder 70. In this structure, the holder 70 and the fixed portion 50 are not provided in the opening direction E3 of the mouth 111. Thus, when the outer sheath 32 moves in the following direction, the outer sheath 32 is restricted from colliding with the holder 70 and the fixed portion 50.

(12) The opening direction E3 of the mouth 111 is set so as not to be oriented toward the installation surface P1a of the vehicle body panel P1 when the fixed portion 50 is fixed to the installation surface P1a. In this structure, when the outer sheath 32 moves in the following direction, the outer sheath 32 is restricted from colliding with the vehicle body panel P1.

(13) The opening direction E3 of the mouth 111 is set so as to be oriented upward in the vertical direction when the fixed portion 50 is fixed to the installation surface P1a of the vehicle body panel P1. In this structure, the weight of the electric wire 31 and the outer sheath 32 restricts the electric wire 31 and the outer sheath 32 from falling from the clamp 41.

Modifications

The above-described embodiment may be modified as follows. The above-described embodiments and the following modifications can be combined as long as the combined modifications remain technically consistent with each other.

The structure of the insertion groove 60 is not limited to the above-described embodiment and may be changed.

For example, the dimension of the first guide 64 in the second installation direction D2 may be set to be the same as the dimension of the second guide 65 in the second installation direction D2. Alternatively, the dimension of the first guide 64 in the second installation direction D2 may be set to be longer than the dimension of the second guide 65 in the second installation direction D2.

For example, the guide 63 may be omitted.

In the above-described embodiment, the insertion groove 60 is located in the plan view seen in the X-axis direction such that the insertion groove 60 protrudes further than the holders 70 and 100 in the second installation direction D2. Instead, the insertion groove 60 may be located in the plan view seen in the X-axis direction such that the insertion groove 60 is arranged in line with the holders 70 and 100 in the Z-axis direction, which is orthogonal to the X-axis direction.

In the fixed portion 50 of the above-described embodiment, the fixed plate 56 is made of a metal material. Instead, for example, the fixed plate 56 may be made of synthetic plastic. In this case, the base 51 (holding walls 52 and 53) may be provided integrally and continuously with the fixed plate 56.

In the holder 70, the accommodation portion 80 and the cover 90 do not have to be engaged in the same manner as the above-described embodiment. Instead, for example, engagement portions with engagement tabs may be provided on the holding walls 82 and 83 of the accommodation portion 80, and a lock frame may be provided on the cover 90.

In the holder 100, the accommodation portion 110 and the cover 120 do not have to be engaged in the same manner as the above-described embodiment. Instead, for example, engagement portions with engagement tabs may be provided on the holding walls 112 and 113 of the accommodation portion 110, and a lock frame may be provided on the cover 120.

In the above-described embodiment, the force of fixing the cover 120 to the accommodation portion 110 may be set to be smaller than the force of fixing the cover 90 to the accommodation portion 80. This structure allows the cover 120 to be removed more easily than the cover 90. Thus, for example, when the conductive passage 11 held by the holder 70 moves toward the cover 120 as the first device M1 moves from the original installation position during a vehicle collision, the cover 120 is easily removed from the accommodation portion 110 by the movement of the conductive passage 11. This restricts the prevention of movement of the conductive passage 11 caused by the cover 120. Thus, the clamp 41 and the conductive passage 12 are restricted from moving as the conductive passage 11 moves.

In this case, it is preferred that the cover 120 be oriented upward in the vertical direction. This structure prevents the cover 120 from being separated due to the weight of the conductive passage 11.

In the holder 70 of the above-described embodiment, the accommodation portion 80 and the cover 90 are separate components. Instead, for example, the accommodation portion 80 and the cover 90 may be integrally provided. In this case, for example, a cover coupled to one of the holding walls 82 and 83 by a hinge such that the mouth 81 can be opened and closed by opening and closing the hinge can be used.

In the holder 100 of the above-described embodiment, the accommodation portion 110 and the cover 120 are separate components. Instead, for example, the accommodation portion 110 and the cover 120 may be integrally provided. In this case, for example, a cover coupled to one of the holding walls 112 and 113 by a hinge such that the mouth 111 can be opened and closed by opening and closing the hinge can be used.

In the above-described embodiment, the cover 90 and the cover 120 are separate components. Instead, for example, the cover 90 and the cover 120 may be integrally provided. That is, a cover that collectively covers the mouth 81 of the accommodation portion 80 and the mouth 111 of the accommodation portion 110 may be provided.

The cover 90 of the above-described embodiment may be omitted. In this case, instead of the cover 90, the accommodation portion 80 includes, for example, a holding structure that prevents the separation of the conductive passage 12 from the mouth 81 of the accommodation portion 80.

The cover 120 of the above-described embodiment may be omitted. In this case, instead of the cover 120, the accommodation portion 110 includes, for example, a holding structure that prevents the separation of the conductive passage 11 from the mouth 111 of the accommodation portion 110.

As long as the holder 70 of the above-described embodiment has a structure capable of holding the conductive passage 12, the structure is not particularly limited. For example, the inner surfaces of the holding walls 82 and 83 may be arcuate. For example, the inner surface of the holding wall 84 may be arcuate. For example, the projection 89 on the outer surface of the protrusion 88 may be omitted. For example, the protrusion 88 may be omitted.

In the above-described embodiment, the member for fixing the protrusion 88 and the conductive passage 12 to each other is the cable tie C1. Instead, for example, the member for fixing the protrusion 88 and the conductive passage 12 to each other may be an adhesive tape or a caulking band.

As long as the holder 100 of the above-described embodiment has a structure capable of holding the conductive passage 11, the structure is not particularly limited. For example, the inner surfaces of the holding walls 112 and 113 may be arcuate. For example, the inner surface of the holding wall 114 may be arcuate. For example, a protrusion similar to the protrusion 88 may be provided on at least one of the ends of the holding wall 114 in the Y-axis direction.

In the above-described embodiment, the opening direction E3 of the mouth 111 of accommodation portion 110 is oriented upward in the vertical direction. Instead, for example, the opening direction E3 of the mouth 111 may be oriented downward in the vertical direction or may be oriented in the opposite direction of the opening direction E2 of the mouth 81 of the accommodation portion 80.

In the above-described embodiment, the opening direction E2 of the mouth 81 of accommodation portion 80 is oriented toward the installation surface P1a in the X-axis direction. For example, the opening direction E2 of the mouth 81 may be oriented toward the side opposite from the installation surface P1a in the X-axis direction or may be oriented upward in the vertical direction.

In the above-described embodiment, the opening direction E2 of the mouth 81 and the opening direction E3 of the mouth 111 are set to intersect each other. Instead, the opening direction E2 of the mouth 81 and the opening direction E3 of the mouth 111 may be set to be parallel to each other. For example, the opening directions E2 and E3 may be both oriented upward in the vertical direction.

In the clamp 41 of the above-described embodiment, the fixed portion 50, the holder 70, and the holder 100 are laid out in this order. Instead, for example, the fixed portion 50 may be arranged between the holder 70 and the holder 100.

In the wire harness 10 of the above-described embodiment, the holder 70 holds the conductive passage 12 for low voltage, and the holder 100 holds the conductive passage 11 for high voltage. Instead, for example, the holder 70 may hold the conductive passage 11 for high voltage, the holder 100 may hold the conductive passage 12 for low voltage.

The structure of the conductive passage 11 is not limited to the above-described embodiment and may be changed. For example, the number of the electric wires 31 accommodated in the outer sheath 32 may be changed to one or may be changed to three or more. For example, the electric wire 31 may be changed to a low-voltage electric wire 31. Instead of a metal pipe, the outer sheath 32 may be a plastic hard pipe or a member having a lower rigidity than the electric wire 31 (for example, plastic corrugated tube).

The structure of the conductive passage 12 is not limited to the above-described embodiment and may be changed. For example, the number of the electric wires 31 accommodated in the outer sheath 36 may be changed to one or may be changed to three or more. For example, the electric wire 35 may be changed to a high-voltage electric wire 35. Instead of a metal pipe, the outer sheath 36 may be a plastic hard pipe or a member having a lower rigidity than the electric wire 35 (for example, plastic corrugated tube).

In the above-described embodiment, the clamp 41 fixes a single high-voltage conductive passage 11 and a single low-voltage conductive passage 12 to the installation surface P1a. However, the number of conductive passages held by the clamp 41 may be set in correspondence with the structure of a vehicle, and the clamp may fix one conductive passage to the installation surface P1a or may fix three conductive passages or more to the installation surface P1a. When the number of conductive passages is changed to one, for example, the holder 100 is omitted from the clamp 41. This conductive passage may be used for either high voltage or low voltage. When the number of conductive passages is changed to three, for example, one high-voltage conductive passage and two low-voltage conductive passages may be provided. Instead, in this case, two high-voltage conductive passages and one low-voltage conductive passage may be provided.

In the above-described embodiment, bolts are illustrated as examples of the fasteners B1 and B2. Instead, for example, as long as the clamps 41 and 42 can be fixed to the installation surfaces P1a and P2a, the fasteners B1 and B2 are not limited to bolts and may be various known fasteners.

In the above-described embodiment, the fastener B2 protruding from the installation surface P2a is inserted into and fixed to the insertion hole 161 of the clamp 42. Instead, a fixing projection protruding in the installation direction D3 may be provided on the fixed portion 160 of the clamp 42 such that the fixing projection is inserted into and fixed to a fixed hole in the installation surface P2a of the vehicle body panel P2.

The clamp 42 of the above-described embodiment may be omitted.

The clamp 43 of the above-described embodiment may be omitted.

The routing paths of the conductive passages 11 and 12 are not limited to the above-described embodiment and may be changed. For example, the routing paths of the conductive passages 11 and 12 may be changed to untwisted paths.

In the above-described embodiment, the fixation portions are the vehicle body panels P1 and P2. Instead, for example, the fixation portion may be applied to a bracket that is coupled to a vehicle body panel. Alternatively, for example, the fixation portion may be applied to the outer surface of the housing of an electric device installed in the vehicle V.

DESCRIPTION OF REFERENCE CHARACTERS

B1, B2 . . . Fastener
C1 . . . Cable Tie
D1 . . . First Installation Direction
D2 . . . Second Installation Direction
D3 . . . Installation Direction
E1 . . . Opening Direction (Second Direction)
E2 . . . Opening Direction (Third direction)
E3 . . . Opening Direction (Fourth direction)
F1 . . . Insertion Direction
M1 . . . First Device
M2 . . . Second Device
M3 . . . Third Device
M4 . . . Fourth Device
P1, P2 . . . Vehicle Body Panel (Fixation Portion)
P1a . . . Installation Surface (First Installation Surface)
P2a . . . Installation Surface (Second Installation Surface)
V . . . Vehicle
10 . . . Wire Harness
11, 12 . . . Conductive Passage
21, 23, 25, 27, 29 . . . Extension
22, 24, 26, 28 . . . Bent Portion
31 . . . Electric Wire (Second Electric Wire)
32 . . . Outer Sheath (Second Outer Sheath)
35 . . . Electric Wire (First Electric Wire)
36 . . . Outer Sheath (First Outer Sheath)
40, 43 . . . Clamp
41 . . . Clamp (First Clamp)
42 . . . Clamp (Second Clamp)
50 . . . Fixed Portion
51 . . . Base
52 . . . Holding Wall
53 . . . Holding Wall
54 . . . Mount
55 . . . Fastening Hardware
56 . . . Fixed Plate
57 . . . Protrusion
58 . . . Protrusion
60 . . . Insertion Groove
61 . . . Mouth
62 . . . Groove
63 . . . Guide
64 . . . First Guide
65 . . . Second Guide
70 . . . Holder (First Holder)
80 . . . Accommodation Portion
81 . . . Mouth (First Mouth)
82 . . . Holding Wall
82X . . . Insertion Groove
83 . . . Holding Wall
83X . . . Insertion Groove
84 . . . Holding Wall
84X . . . Through-Hole
85 . . . Accommodation Space
86 . . . Lock Frame
87 . . . Biasing Portion
88 . . . Protrusion
89 . . . Projection
90 . . . Cover (First Cover)
91 . . . Opposed Wall
92 . . . Engagement Portion
93 . . . Engagement Tab
95 . . . Protrusion
96 . . . Recess
100 . . . Holder (Second Holder)
110 . . . Accommodation Portion
111 . . . Mouth (Second Mouth)
112 . . . Holding Wall
113 . . . Holding Wall
114 . . . Holding Wall
114X . . . Through-Hole
115 . . . Accommodation Space
116 . . . Lock Frame
117 . . . Biasing Portion
120 . . . Cover (Second Cover)
121 . . . Opposed Wall
122 . . . Engagement Portion
123 . . . Engagement Tab
125 . . . Protrusion
126 . . . Recess
150 . . . Holder
150A . . . Upper Surface
160 . . . Fixed Portion
161 . . . Insertion hole Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A clamp comprising:
a first holder that configured to hold a first outer sheath that accommodates a first electric wire; and
a fixed portion configured to be connected to the first holder and fixed to a fixation portion, the fixed portion including an insertion groove into which a columnar fastener on the fixation portion is configured to be inserted, wherein:
the insertion groove extends through the fixed portion in a first direction, and the insertion groove is mouth shaped in a plan view seen in the first direction, the mouth opening in a second direction intersecting the first direction, the mouth includes a guide that guides the fastener toward a rear side of the guide in an insertion direction parallel to the second direction, and the guide is inclined such that an opening width of the insertion groove increases from the rear side of the guide in the insertion direction toward a front side of the guide in the insertion direction.

2. The clamp according to claim 1, wherein:

the clamp is configured to be moved in two directions in two steps to install the clamp on the fixation portion, the two directions being a first installation direction and a second installation direction, the second installation direction intersecting the first installation direction and being parallel to the insertion direction, the guide includes a first guide and a second guide, the first guide being located on a rear side in the first installation direction when the guide is positioned to be installed on the fixation portion, the second guide being located on a front side in the first installation direction when the guide is positioned to be installed on the fixation portion, and a dimension of the first guide in the second installation direction is set to be smaller than a dimension of the second guide in the second installation direction.

3. The clamp according to claim 2, wherein the insertion groove is located in a plan view seen in the first direction such that the insertion groove protrudes further than the first holder in the second installation direction.

4. The clamp according to claim 1, wherein:

the fixed portion includes a plastic base provided integrally with the first holder and a fixed plate held on the base, the fixed plate is made of a metal material having a higher rigidity than a rigidity of a material of which the base is made, and the fixed plate includes the insertion groove.

5. The clamp according to claim 1, further comprising a second holder configured to hold a second outer sheath that accommodates a second electric wire configured to be connected to a different device than a device the first electric wire is configured to be connected to, wherein the first holder, the second holder, and the fixed portion are positioned in a direction intersecting both the first direction and the second direction.

6. The clamp according to claim 1, further comprising a second holder configured to hold a second outer sheath that accommodates a second electric wire configured to be connected to a different device than a device the first electric wire is configured to be connected, wherein:

the first holder includes a first holder mouth that opens in a third direction orthogonal to a longitudinal direction of the first outer sheath, the first holder mouth allowing the first outer sheath to be inserted into the first holder, the second holder includes a second holder mouth that opens in a fourth direction orthogonal to a longitudinal direction of the second outer sheath, the second holder mouth allowing the second outer sheath to be inserted into the second holder, and the third direction and the fourth direction intersect each other.

7. The clamp according to claim 6, wherein:

the first holder includes a first cover that covers the first holder mouth, the second holder includes a second cover that covers the second holder mouth, and the first cover and the second cover are separate components.

8. The clamp according to claim 7, wherein:

the second holder includes an accommodation portion, the accommodation portion including the second holder mouth and accommodating the second outer sheath, and the accommodation portion and the second cover are separate components.

9. The clamp according to claim 6, wherein:

the first holder includes a first end connected to the fixed portion and a second end connected to the second holder, and the fourth direction is oriented away from the first holder.

10. The clamp according to claim 6, wherein the fourth direction is oriented toward an installation surface of the fixation portion when the fixed portion is fixed to the installation surface.

11. The clamp according to claim 6, wherein the fourth direction is oriented upward in a vertical direction when the fixed portion is fixed to an installation surface of the fixation portion.

12. A wire harness comprising:

the first electric wire;

the first outer sheath;

the clamp according to claim 1, the clamp being a first clamp coupled to the first outer sheath; and a second clamp coupled to the first outer sheath at a position away from the first clamp in a longitudinal direction of the first outer sheath, wherein:

the first clamp is configured to be fixed to a first installation surface of the fixation portion, and the second clamp is configured to be fixed to a second installation surface on a plane perpendicular to the first installation surface of the fixation portion.

13. A wire harness comprising:

the first electric wire;

the first outer sheath;

the second electric wire;

the second outer sheath;

the clamp according to claim 5, the clamp being a first clamp configured to be coupled to the first outer sheath and the second outer sheath in a portion where the first outer sheath and the second outer sheath are routed in parallel to each other; and a second clamp configured to be coupled to the second outer sheath, wherein:

the first clamp is configured to be fixed to a first installation surface of the fixation portion, and the second clamp is configured to be fixed to a second installation surface on a plane perpendicular to the first installation surface of the fixation portion.

14. The wire harness according to claim 12, wherein the second direction is parallel to a direction in which the second clamp is configured to be coupled to the second installation surface.

15. The wire harness according to claim 13, wherein the second direction parallel to a direction in which the second clamp is configured to be coupled to the second installation surface.

16. A wire harness comprising:

the first electric wire;

the first outer sheath;

the second electric wire;

the second outer sheath; and the clamp according to claim 6, wherein the first outer sheath and the second outer sheath are twisted and routed such that a respective direction in which the first outer sheath and the second outer sheath are positioned is changed in a section extending in a respective longitudinal direction of the first outer sheath and the second outer sheath.

17. The wire harness according to claim 16, wherein the first electric wire is a low-voltage electric wire capable of supplying 12 volts, the second electric wire is a high-voltage electric wire capable of supply more than 12 volts, including an end connected to an inverter, and the fourth direction is set to be oriented such that the second electric wire and the second outer sheath are configured to move in the same direction as the inverter moves during a vehicle collision.

\* \* \* \* \*